US007086154B2

(12) United States Patent
Ito et al.

(10) Patent No.: US 7,086,154 B2
(45) Date of Patent: Aug. 8, 2006

(54) PROCESS OF MANUFACTURING NOZZLE PLATE FOR INK-JET PRINT HEAD

(75) Inventors: Atsushi Ito, Owariasahi (JP); Tsuyoshi Eguchi, Nagoya (JP); Toshiya Matsuyama, Tajimi (JP); Yasunori Kobayashi, Gifu (JP); Yumiko Ohashi, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 86 days.

(21) Appl. No.: 10/600,612

(22) Filed: Jun. 23, 2003

(65) Prior Publication Data

US 2004/0088859 A1 May 13, 2004

(30) Foreign Application Priority Data

Jun. 26, 2002 (JP) ............................ 2002-186091
Nov. 12, 2002 (JP) ............................ 2002-328221

(51) Int. Cl.
*B21D 53/00* (2006.01)
*G01D 15/00* (2006.01)
*G11B 5/27* (2006.01)

(52) U.S. Cl. .................... 29/890.1; 29/156 C; 29/412; 29/417; 216/27

(58) Field of Classification Search ............... 29/890.1, 29/156 C, 412, 417; 347/15, 45, 92, 29; 204/281; 205/67, 73; 216/27, 48; 72/325, 72/465
See application file for complete search history.

(56) References Cited

U.S. PATENT DOCUMENTS 5,863,371 A 1/1999 Takemoto et al.
5,933,170 A * 8/1999 Takeuchi et al. .............. 347/71
6,179,978 B1 * 1/2001 Hirsh et al. ................. 204/281
6,290,340 B1 * 9/2001 Kitahara et al. .............. 347/70

FOREIGN PATENT DOCUMENTS

EP 0 531 535 A1 3/1993
EP 0 858 893 A2 8/1998
EP 1 043 160 A1 10/2000
JP A 5-229127 9/1993
JP A 5-338180 12/1993
JP A 9-85956 3/1997
JP A 09-085956 3/1997
JP B2 3063786 5/2000
JP A 2000-289211 10/2000
JP A 2000-318163 11/2000
JP A 2001-018398 1/2001
JP A 2001-18398 1/2001
JP A 2001-310471 11/2001
JP A 2002-113529 4/2002

* cited by examiner

*Primary Examiner*—A. Dexter Tugbang
*Assistant Examiner*—Tai Van Nguyen
(74) *Attorney, Agent, or Firm*—Oliff & Berridge, PLC

(57) ABSTRACT

A process of manufacturing a nozzle plate for an ink-jet print head. The nozzle plate includes (a) a substrate having an outside surface which is to be opposed to a print media, an inside surface which is opposite to the outside surface and nozzle holes which are formed through the substrate so as to be open in the outside and inside surfaces, and (b) a non-wetting layer which has a non-wetting characteristic and which covers the outside surface of the substrate. The manufacturing process includes: (i) a masking step of applying a resist on the inside surface of the substrate, and charging the nozzle holes with the insulating material such that portions of the resist protrude outwardly from openings of the nozzle holes on the outside surface; (ii) a non-wetting-layer forming step of forming the non-wetting layer on the outside surface in a plating operation; and (iii) an unmasking step of removing the resist from the substrate.

13 Claims, 12 Drawing Sheets

(a)

(b)

(c)

(d)

PROCESS OF MANUFACTURING NOZZLE PLATE FOR INK-JET PRINT HEAD

This application is based on Japanese Patent Applications No. 2002-186091 filed in Jun. 26, 2002 and No. 2002-328221 filed in Nov. 12, 2002, the contents of which are incorporated hereinto by reference.

BACKGROUND OF THE INVENTION

1. Field of the Invention

The present invention relates to a nozzle plate which is to constitute a part of a print head of an ink-jet printer capable of ejecting an ink toward a print media so as to form a desired image on the print media.

2. Discussion of Related Art

There is known an ink-jet print head which is constituted by a plurality of thin plates which are laminated on and bonded to one another. Each of the laminated thin plates has apertures formed by, for example, an etching operation, so that the apertures formed in the laminated thin plates are mutually connected and cooperate with one another to form pressure chambers, manifold chambers, communication passages and nozzle holes within a laminated structure provided by the laminated thin plates. The ink-jet print head constituted by the laminated thin plates includes a head body and a nozzle plate which is bonded to a surface of the head body. The head body has the pressure chambers in each of which the ink is pressurized by activation of a piezoelectric element, and the communication passages for supplying the ink from the pressure chambers toward the nozzle holes. The nozzle plate has the nozzle holes through which the ink is ejected toward the print media. This ink-jet print head is capable of ejecting, through the nozzle holes, the ink in the form of fine droplets toward the print media at a high speed.

It is known that the nozzle plate may be coated at its outside surface (which is to be opposed to the print media) with a plating layer having a non-wetting characteristic, in the interest of preventing the ejected ink from adhering to the nozzle plate.

For assuring a reliable prevention of the ejected ink from adhering to the nozzle plate, it is desirable that the plating layer is adapted to cover the entirety of the outside surface of the nozzle plate including an edge of opening of each of nozzle holes, for thereby preventing the ink from adhering to the edge of the opening of each nozzle hole. However, it is difficult to control the plating operation in such a manner that enables the plating layer to be formed to extend up to the edge of the opening of each nozzle hole. Particularly, where the diameter and density of the nozzle holes are reduced and increased, respectively, for satisfying recent demands for a further improved quality of printed images, it is extremely difficult to enable the plating layer to be formed to extend up to the edge of the opening of each nozzle hole.

There is known an arrangement in which the plating layer is intentionally extended to the inner surface of each nozzle hole so that the inner surface of each nozzle hole as well as the outside surface of the nozzle plate is covered by the plating layer. This arrangement is effective to prevent the ejected ink from adhering to the edge of the opening of each nozzle hole. However, this arrangement suffers from a reduced degree of wettability (affinity) of the inner surface of each nozzle hole with respect to the ink, because the inner surface of each nozzle hole is coated with the plating layer having the non-wetting characteristic. The reduced degree of wettability of the inner surface of the nozzle hole makes it difficult to reliably form a desired-shaped meniscus (curved free surface) of the ink at the opening of each nozzle hole.

For achieving a printing operation with an ink-jet printer at a high accuracy, it is necessary to appropriately control a shape of the meniscus formed at the opening of each nozzle hole. This is because a direction of ejection of the ink droplet and a size of the ejected ink droplet vary depending on the shape of the meniscus. In this sense, there has been developed various techniques for forming the nozzle plate with a high precision, for obtaining an appropriate shape of the meniscus, and accordingly for improving the performance of the ink-jet printer.

As a technique for forming the nozzle hole in the nozzle plate, there is known a process including a step of piercing the nozzle plate by using a punch which has a generally conical shape configured to form a desired shape of the nozzle hole. Described more specifically, a portion of the nozzle plate (in which the nozzle hole is to be formed) is plastically deformed by the punch in a direction away from the inside surface of the nozzle plate toward the outside surface of the nozzle plate, such that a recess and a protrusion are formed in the inside and outside surfaces of the deformed portion of the nozzle plate, respectively. Then, the protrusion formed in the outside surface of the plate is eliminated in a polishing operation with abrasive grains, so that the recess formed in the inside surface of the plate converts into a through-hole as the nozzle hole. An example of this process is disclosed by JP-A-2000-289211.

As a technique for forming the non-wetting plating layer, there is known a process including a step of a masking step of masking the inside surface of the nozzle plate and the inner surface of each nozzle hole, and a non-wetting-layer forming step of forming the non-wetting plating layer on the outside surface of the nozzle plate. Described more specifically, in the masking step, a resin is provided to cover the inside surface of the nozzle plate and a tapered portion of the inner surface of each nozzle hole, so that the outside surface of the nozzle plate and a small-diameter end portion of the inner surface of each nozzle hole (which portion is adjacent to the outside surface of the nozzle plate) remains unmasked. In the non-wetting-layer forming step, the non-wetting plating layer is formed to cover the outside surface of the nozzle plate and the small-diameter end portion of the inner surface of each nozzle hole which are not masked with the resin. An example of this process is disclosed by JP-A-2001-18398.

As another technique for forming the non-wetting plating layer, there is known a process including a wetting-layer forming step of forming a wetting layer (made of a material having a wetting characteristic) on the inside surface of the nozzle plate, and a non-wetting layer forming step of forming the non-wetting layer on the outside surface of the nozzle plate and an end portion of the inner surface of each nozzle which portion is adjacent to the outside surface of the nozzle plate. In the non-wetting-layer forming step, the wetting layer serves as a masking member, so that the non-wetting layer is not deposited on the inside surface of the nozzle plate which is covered with the wetting layer. An example of this process is disclosed by JP-A-H9-85956.

However, in the above-described known techniques for the formation of the non-wetting layer, the non-wetting layer can not be formed accurately on a required area of the nozzle plate, because of difficulty in covering accurately the required portion of the inner surface of the nozzle hole with the resin, or in forming the wetting layer as the masking member accurately on the inside surface of the nozzle plate. That is, in the known techniques, it is difficult to stably establish a desired boundary between the wetting area and the non-wetting area in each nozzle hole, making it impossible to provide each nozzle hole with a desired characteristic of ink ejection.

SUMMARY OF THE INVENTION

It is therefore an object of the present invention to provide a nozzle-plate manufacturing process which assures a reliable formation of the non-wetting layer on a required area of a nozzle plate, minimizing a risk of clogging of each nozzle hole of the manufactured nozzle plate without reducing wettability of the inner surface of each nozzle hole. This object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A process of manufacturing a nozzle plate for an ink-jet print head, the nozzle plate including (a) a substrate having an outside surface which is to be opposed to a print media, an inside surface which is opposite to the outside surface and nozzle holes which are formed through the substrate so as to be open in the outside and inside surfaces, and (b) a non-wetting film or layer which has a non-wetting characteristic and which covers the outside surface of the substrate, the process comprising: (i) a masking step of applying a resist on the inside surface of the substrate, and charging the nozzle holes with the insulating material such that portions of the resist protrude outwardly from openings of the nozzle holes on the outside surface; (ii) a non-wetting-layer forming step of forming the non-wetting layer on the outside surface in a plating operation; and (iii) an unmasking step of removing the resist from the substrate.

In the manufacturing process according to this mode (1) of the invention, the masking step is implemented by applying the resist as an insulating material on the inside surface of the substrate and filling or charging each nozzle hole with the resist. In this instance, since each nozzle hole takes the form of a through-hole, an air can be discharged from each nozzle hole upon the charging of each nozzle hole with the resist, so that the inner surface of each nozzle hole can be reliably masked with the resist. Further, in the masking step, the nozzle holes are charged with the resist such that portions of the resist protrude outwardly from openings of the respective nozzle holes (which openings are located on the outside surface of the substrate). This arrangement assures a reliable masking of the entirety of the inner surface of each nozzle hole (including its portion adjacent to the opening) with the resin, thereby preventing the non-wetting layer from being erroneously formed on some portion of the inner surface of each nozzle hole. It is noted that the outwardly protruding portions of the resist may be eliminated either before or after the implementation of the non-wetting layer forming step. Where the protruding portions of the resist are eliminated before the non-wetting layer forming step, the protruding portions can be eliminated by planing or smoothing the outside surface of the substrate, for example, in a polishing or lapping operation. Where eliminated after the non-wetting layer forming step, the protruding portions can be eliminated together with the non-protruding portion in the unmasking step. It is also noted that the technical features described in this mode (1) is applicable to the manufacturing process defined in any one of modes (2)–(11) which are described below.

(2) A process of manufacturing a nozzle plate for an ink-jet print head, the nozzle plate including (a) a substrate having an outside surface which is to be opposed to a print media, an inside surface which is opposite to the outside surface and nozzle holes which are formed through the substrate so as to be open in the outside and inside surfaces, and (b) a non-wetting layer which has a non-wetting characteristic and which covers the outside surface of the substrate, the process comprising: (i) a substrate setting step of setting the substrate on a support, such that the outside surface is positioned downwardly of the inside surface, without openings of the nozzle holes on the outside surface being in contact with the support; (ii) a masking step of applying an insulating material on the inside surface and charging the nozzle holes with the insulating material; (iii) a non-wetting-layer forming step of forming the non-wetting layer on the outside surface; and (iv) an unmasking step of removing the insulating material from the substrate, wherein the masking step includes: (ii-1) an insulating-material disposing step of disposing a resist as the insulating material on the inside surface of the substrate; and (ii-2) a bar coating step of disposing a bar on the resist disposed on the inside surface, and moving at least one of the bar and the substrate relative to the other in a direction parallel to the inside surface such that portions of the resist protrude outwardly from openings of the nozzle holes on the outside surface of the substrate.

The manufacturing process according to this mode (2) of the invention includes the substrate setting step which is implemented to set the substrate on the support such that the openings of the nozzle holes on the outside surface is not in contact with the support. Therefore, during the bar coating step in which the bar is moved on the resist disposed on the inside surface in a direction parallel to the inside surface, the outwardly protruding portions of the resist is prevented from being adhering to the outside surface of the substrate, thereby avoiding an erroneous masking of the outside surface with the resist. That is, the non-wetting layer can be reliably formed on the entirety of the outside surface. Thus, it is possible to minimize a risk of clogging of each nozzle hole of the manufactured nozzle plate without reducing wettability of the inner surface of each nozzle hole. It is noted that the nozzle holes may be formed by punching the substrate as described below in the process of mode (5), or may be otherwise formed.

(3) A process according to mode (2), wherein the support has a large height portion and a small height portion, and wherein the substrate is set on the support in the substrate setting step, such that the substrate is supported by the large height portion while each of the openings of the nozzle holes is positioned above the small height portion.

(4) A process according to mode (2) or (3), wherein the bar coating step is implemented such that each of the portions of the resist protrudes outwardly from a corresponding one of the openings of the nozzle holes by at least 1 μm.

(5) A process of manufacturing a nozzle plate for an ink-jet print head, the nozzle plate including (a) a substrate having an outside surface which is to be opposed to a print media, an inside surface which is opposite to the outside surface and nozzle holes which are formed through the substrate so as to be open in the outside and inside surfaces, and (b) a non-wetting layer which has a non-wetting characteristic and which covers the outside surface of the substrate, the process comprising: (i) a through-holes forming step of forming through-holes as the nozzle holes in the substrate, by punching the substrate from the inside surface toward the outside surface; (ii) a masking step of applying an insulating material on the inside surface and charging the nozzle holes with the insulating material; (iii) a surface smoothing step of planing or smoothing the outside surface; (iv) a non-wetting-layer forming step of forming the non-wetting layer on the outside surface in a plating operation; and (v) an unmasking step of removing the insulating material from the substrate.

In the manufacturing process according to this mode (5) of the invention, the masking step is implemented by applying the insulating material (such as a resist) on the inside surface of the substrate and filling or charging each nozzle hole with the insulating material. Since each nozzle hole takes the form of the through-hole, an air can be discharged from each nozzle hole upon the charging of each nozzle hole with the insulating material, so that the inner surface of each nozzle hole can be reliably masked with the insulating material. Further, in the masking step, it is possible to apply the insulating material into each nozzle hole such that portions of the insulating material protrude outwardly from openings of the nozzle holes (which openings are located on the outside surface of the substrate). The outwardly protruding portions of the insulating material can be eliminated in the surface smoothing step in which the outside surface of the substrate may be subjected to a polishing or lapping operation. This arrangement assures a reliable masking of the inner surface of each nozzle hole with the insulating material, without an erroneous masking of the outside surface with the insulating material. In other words, owing to the arrangement, the boundary between the masked area and the unmasked area can coincide with an intersection between the inner surface of each nozzle hole and the outside surface of the substrate. Therefore, the present manufacturing process assures a reliable formation of the non-wetting layer exclusively on a required area, i.e., the outside surface of the substrate, thereby minimizing a risk of clogging of each nozzle hole of the manufactured nozzle plate without reducing wettability of the inner surface of each nozzle hole. Still further, in the surface smoothing step, it is possible to eliminate not only the outwardly protruding portions but also burrs which have been formed at edges of the openings of the nozzle holes in the through-hole forming step. The simultaneous elimination of the outwardly protruding portions of the insulating material and the burrs leads to a reduced number of steps of the manufacturing process.

(6) A process according to mode (5), wherein the nozzle holes are charged with a resist as the insulating material in the masking step such that portions of the resist protrude outwardly from openings of the nozzle holes on the outside surface of the substrate.

(7) A process according to mode (5) or (6), wherein the masking step includes: (ii-1) an insulating-material disposing step of disposing a resist as the insulating material on the inside surface of the substrate; and (ii-2) a bar coating step of disposing a bar on the resist disposed on the inside surface, and moving at least one of the bar and the substrate relative to the other in a direction parallel to the inside surface such that portions of the resist protrude outwardly from openings of the nozzle holes on the outside surface of the substrate.

(8) A process according to mode (6) or (7), wherein each of the portions of the resist protrudes outwardly from a corresponding one of the openings of the nozzle holes by at least 1 μm.

(9) A process according to any one of modes (5)–(8), wherein the surface smoothing step is implemented by a polishing or lapping operation in which the outwardly protruding portions of the resist, together with burrs formed at edges of the openings of the nozzle holes on the outside surface in the through-holes forming step, are eliminated.

(10) A process of manufacturing a nozzle plate for an ink-jet print head, the nozzle plate including (a) a substrate having an outside surface which is to be opposed to a print media, an inside surface which is opposite to the outside surface and nozzle holes which are formed through the substrate so as to be open in the outside and inside surfaces, and (b) a non-wetting layer which has a non-wetting characteristic and which covers the outside surface of the substrate, the process comprising: (i) a masking step of applying an insulating material on the inside surface and charging the nozzle holes with the insulating material, by superposing the substrate on a resist layer formed of a resist as the insulting material, such that the inside surface is brought into contact with the resist layer, so that the nozzle holes are charged with the resist owing to a capillary action of the resist; (ii) a non-wetting-layer forming step of forming the non-wetting layer on the outside surface in a plating operation; and (iii) an unmasking step of removing the resist from the substrate.

In the manufacturing process according to this mode (10) of the invention, the masking step is implemented by superposing the substrate on the resist layer such that the inside surface is brought into contact with the resist layer, whereby each nozzle hole is charged with the resist owing to the capillary action of the resist. The resist has such a degree of viscosity that permits the portion of the resist layer (which portion is located right below each nozzle hole) to be drawn up, against a gravity, into each nozzle hole such that a top end of the drawn portion of the resist layer slightly protrudes from the opening of the corresponding nozzle hole on the outside surface of the substrate. In this instance, the drawn portion of the resist does not cover the outside surface, since the capillary action of the resist occurs only in a narrow space, i.e., in a space within each nozzle hole. Therefore, the outside surface is not erroneously masked with the resist in the masking step, so that the non-wetting layer can be reliably formed on the entirety of the outside surface. Thus, it is possible to minimize a risk of clogging of each nozzle hole of the manufactured nozzle plate without reducing wettability of the inner surface of each nozzle hole. It is noted that the nozzle holes may be formed by punching the substrate as in the process of the above-described mode (5), or may be otherwise formed.

(11) A process of manufacturing a nozzle plate for an ink-jet print head, the nozzle plate including (a) a substrate having an outside surface which is to be opposed to a print media, an inside surface which is opposite to the outside surface and nozzle holes which are formed through the substrate so as to be open in the outside and inside surfaces, and (b) a non-wetting layer which has a non-wetting characteristic and which covers the outside surface of the substrate, the process comprising: (i) a masking step of covering the inside surface of the substrate with a masking member; (ii) a non-wetting-layer forming step of forming a non-wetting layer on the outside surface and inner surfaces of the nozzle holes; (iii) an unmasking step of removing the masking member from the substrate; and (iv) an irradiating step of irradiating portions of the non-wetting layer which cover the inner surfaces of the nozzle holes, such that the irradiated portions of the non-wetting layer lose the non-wetting characteristic.

In the manufacturing process according to this mode (11) of the invention, the masking step is implemented by covering the inside surface of the substrate with the masking member. Unlike the above-described processes according to modes (1)–(10), the inner surface of the each nozzle hole does not have to be masked. In the irradiating step, the portion of the non-wetting layer which portion covers the inner surface of each nozzle hole is irradiated (e.g., with a high-energy radiation such as laser and plasma), so as to lose its non-wetting characteristic and then have a wetting characteristic. In this instance, the other portion of the non-wetting layer, which portion covers the outside surface rather than the inner surface of each nozzle hole, is not radiated whereby its non-wetting characteristic is maintained. Thus, like in the above-described processes, it is possible to minimize a risk of clogging of each nozzle hole of the manufactured nozzle plate without reducing wettability of the inner surface of each nozzle hole. It is noted that the nozzle holes may be formed by punching the substrate as in the process of the above-described mode (5), or may be otherwise formed.

(12) A process of manufacturing a nozzle plate for an ink-jet print head, the nozzle plate including (a) a substrate having an outside surface which is to be opposed to a print media, an inside surface which is opposite to the outside surface and nozzle holes which are formed through the substrate so as to be open in the outside and inside surfaces, and (b) a non-wetting layer which has a non-wetting characteristic and which covers the outside surface of the substrate, the process comprising: (i) a deforming step of plastically deforming portions of the substrate in which the nozzles holes are to be formed, in a direction away from the inside surface toward the outside surface, such that a recess and a protrusion are formed in the inside and outside surfaces of each of the deformed portions of the substrate, respectively; (ii) a covering-layer forming step of forming a covering film or layer on the inside surface and an inner surface of the recess; (iii) a surface smoothing step of smoothing the outside surface, so that the protrusion formed in the outside surface of each of the deformed portions of the substrate is eliminated whereby the recess formed in the inside surface of each of the deformed portions of the substrate converts into a corresponding one of the nozzle holes; and (iv) a non-wetting-layer forming step of forming the non-wetting layer on the outside surface in a plating operation.

In the manufacturing process according to this mode (12) of the invention, each protrusion is eliminated in the surface smoothing step, by smoothing the outside surface after the formation of the covering layer on the inside surface and the inner surface of each recess, so that each recess converts into the corresponding nozzle hole. Owing to this arrangement, an end face of the covering layer formed on the inner surface of each nozzle hole is precisely made flush with the outside surface of the substrate, so that the covering layer serving as a masking member in the non-wetting-layer forming step can be accurately formed on the inner surface of each nozzle hole, without any portion of the inner surface of each nozzle hole being unmasked with the covering layer, and without any portion of the outside surface of the substrate being erroneously masked with the covering layer. In other words, owing to the arrangement, the boundary between the masked area and the unmasked area can coincide with an intersection between the inner surface of each nozzle hole and the outside surface of the substrate. Therefore, the present manufacturing process assures a reliable formation of the non-wetting layer exclusively on a required area, i.e., the outside surface of the substrate, thereby minimizing a risk of clogging of each nozzle hole of the manufactured nozzle plate without reducing wettability of the inner surface of each nozzle hole.

If the covering-layer forming step were implemented after the implementation of the surface smoothing step, namely, if the formation of the covering layer were made after the formation of the through-holes as the nozzle holes, the covering layer would be likely to be formed erroneously on a portion of the outside surface of the substrate adjacent to the opening of each nozzle hole. This leads to a failure of the formation of the non-wetting layer on the portion adjacent to the opening of each nozzle hole, thereby making it impossible to provide each nozzle hole with a desired characteristic of ink ejection.

In the manufacturing process according to this mode (12) of the invention in which the covering-layer forming step is implemented before the surface smoothing step, the end face of the covering layer can be made flush with the outside surface of the substrate, so that the covering layer serving as a masking member in the non-wetting-layer forming step can be accurately formed on the inner surface of each nozzle hole without its erroneous formation on the above-described portion of the outside surface of the substrate that is adjacent to the opening of each nozzle hole. The accurate formation of the covering layer on the inner surface of each nozzle hole leads to a reliable formation of desired-shaped meniscus of the ink at the opening of each nozzle hole.

(13) A process according to mode (12), wherein the covering layer formed in the inside surface and the inner surface of the recess is an insulating film or layer.

(14) A process according to mode (13), wherein a thickness of the insulating layer formed in the insulating-layer forming step is not smaller than a thickness of the non-wetting layer formed in the non-wetting-layer forming step.

In the manufacturing process according to this mode (14) of the invention, the thickness of the insulating layer is adjusted such that the non-wetting layer does not overhang each of the nozzle holes, namely, such that the non-wetting layer does not project from the inner surface of each nozzle hole toward the axis of the nozzle hole.

Since the non-wetting layer grows in an isotropic manner in the process of its formation by the electrolytic plating, the non-wetting layer would protrude from the insulating layer formed on the inner surface of each nozzle hole toward the axis of the nozzle hole, if the thickness of the insulating layer were smaller than that of the non-wetting layer. If the non-wetting layer were formed to overhang each nozzle hole, an overhanging portion of the non-wetting layer would be easily broken upon application of impact to the layer, whereby the accuracy of the ink ejection would be deteriorated. Therefore, the arrangement according to this mode (14) is effective to minimize risk of breakage of the non-wetting layer and accordingly avoid deterioration in accuracy of ejection of the ink, which could be caused in the event of undesirable change of configuration of the opening of each nozzle hole.

In the manufacturing process according to the above-described mode (13) or (14), it is preferable that a film or layer made of silicon dioxide is formed as the insulating layer in the insulating-layer forming step. It is more preferable that the layer is made of silicone dioxide containing carbon, as in the process according to mode (15) described below, rather than high-purity silicon dioxide having substantially no impurity.

(15) A process according to mode (13) or (14), wherein the insulating layer formed in the inside surface and the inner surface of the recess is a film or layer made of silicon dioxide containing carbon.

Although it is known that silicon dioxide is used for covering the inside surface of the nozzle plate substrate and the inner surface of each nozzle hole, a layer provided by the high-purity silicon dioxide tends to be easily removed from the substrate during the surface smoothing step, because the layer of the high-purity silicon dioxide is inherently brittle. The removal of the silicon dioxide layer leads to a formation of the non-wetting layer on a non-required portion of the substrate such as the inner surface of each nozzle hole, thereby suffering from an undesirable reduction in the wettablity of the inner surface of each nozzle hole.

In the nozzle plate manufactured in the process according to this mode (15), the insulating layer is provided by the layer made of silicon dioxide containing carbon, and is accordingly provided with a lower degree of membrane stress than where the insulating layer is provided by the layer made of the high-purity silicon dioxide. Owing to its lower degree of membrane stress, the insulating layer is prevented from being undesirably removed from the substrate in the surface smoothing step, thereby making it possible to avoid an undesirable reduction in the wettablity of the inner surface of each nozzle hole. It is noted that the layer of silicon dioxide containing carbon can be formed at a low temperature (e.g. 150° C.) in accordance with CVD method.

(16) A process according to any one of modes (12)–(15), wherein the recess is formed in the inside surface of the substrate in the deforming step, such that the recess has a depth not smaller than a thickness of the substrate.

(17) A process according to mode (12), wherein the covering layer formed in the inside surface and the inner surface of the recess is a metallic film or layer that is oxidizable under a condition under which the substrate is not oxidizable, the process further comprising: a layer oxidizing step which is implemented, before implementation of the non-wetting-layer forming step, so as to oxidize the metallic layer formed on the inside surface and the inner surface of each of the nozzle holes, such that the metallic layer converts into an oxidized film or layer.

In the manufacturing process according to this mode (17), the deforming step is followed by the covering-layer forming step that is implemented to form the metallic layer made of a metallic material oxidizable under a condition under which the substrate is not oxidizable. After the implementation of the surface smoothing step, the layer oxidizing step is implemented to oxidize the metallic layer such that the metallic layer converts into the oxidized layer having an insulating property. Therefore, in the stage before implementation of the non-wetting layer forming step, an end face of the oxidized or insulating layer formed on the inner surface of each nozzle hole is precisely made flush with the outside surface of the substrate, as in the manufacturing process according to the above-described mode (13). The insulating layer serving as a masking member in the non-wetting-layer forming step can be accurately formed on the inner surface of each nozzle hole, without any portion of the inner surface of each nozzle hole being unmasked with the insulating layer, and without any portion of the outside surface of the substrate being erroneously masked with the insulating layer. Therefore, the manufacturing process assures a reliable formation of the non-wetting layer exclusively on a required area, i.e., the outside surface of the substrate, thereby minimizing a risk of clogging of each nozzle hole of the manufactured nozzle plate without reducing wettability of the inner surface of each nozzle hole.

(18) A process according to mode (17), wherein a thickness of the metallic layer formed in the metallic-layer forming step is not smaller than a thickness of the non-wetting layer formed in the non-wetting-layer forming step.

In the manufacturing process according to this mode (18) of the invention, the thickness of the metallic layer is adjusted such that the non-wetting layer does not overhang each of the nozzle holes, namely, such that the non-wetting layer does not project from the inner surface of each nozzle hole toward the axis of the nozzle hole.

Since the non-wetting layer grows in an isotropic manner in the process of its formation by the electrolytic plating, the non-wetting layer would protrude from the oxidized metallic layer formed on the inner surface of each nozzle hole toward the axis of the nozzle hole, if the thickness of the oxidized metallic layer were smaller than that of the non-wetting layer. If the non-wetting layer were formed to overhang each nozzle hole, an overhanging portion of the non-wetting layer would be easily broken upon application of impact to the layer, whereby the accuracy of the ink ejection would be deteriorated. Therefore, the arrangement according to this mode (18) is effective to minimize risk of breakage of the non-wetting layer and accordingly avoid deterioration in accuracy of ejection of the ink, which could be caused in the event of undesirable change of configuration of the opening of each nozzle hole.

(19) A process according to mode (17) or (18), wherein the substrate is made of stainless steel, and wherein a tantalum layer is formed as the metallic layer in the metallic-layer forming step.

(20) A process according to mode (17) or (18), wherein the substrate is made of stainless steel, and wherein a copper layer is formed as the metallic layer in the metallic-layer forming step.

In the manufacturing process according to this mode (19) or (20) of the invention in which the substrate is made of stainless alloy or steel that is inherently protective against corrosion, the tantalum or copper layer as the metallic layer can be oxidized by heating the metallic layer in an atmosphere, without affecting the substrate. Thus, the metallic layer can easily converts into the oxidized layer.

(21) A process according to any one of modes (17)–(20), wherein the recess is formed in the inside surface of the substrate in the deforming step, such that the recess has a depth not smaller than a thickness of the substrate.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
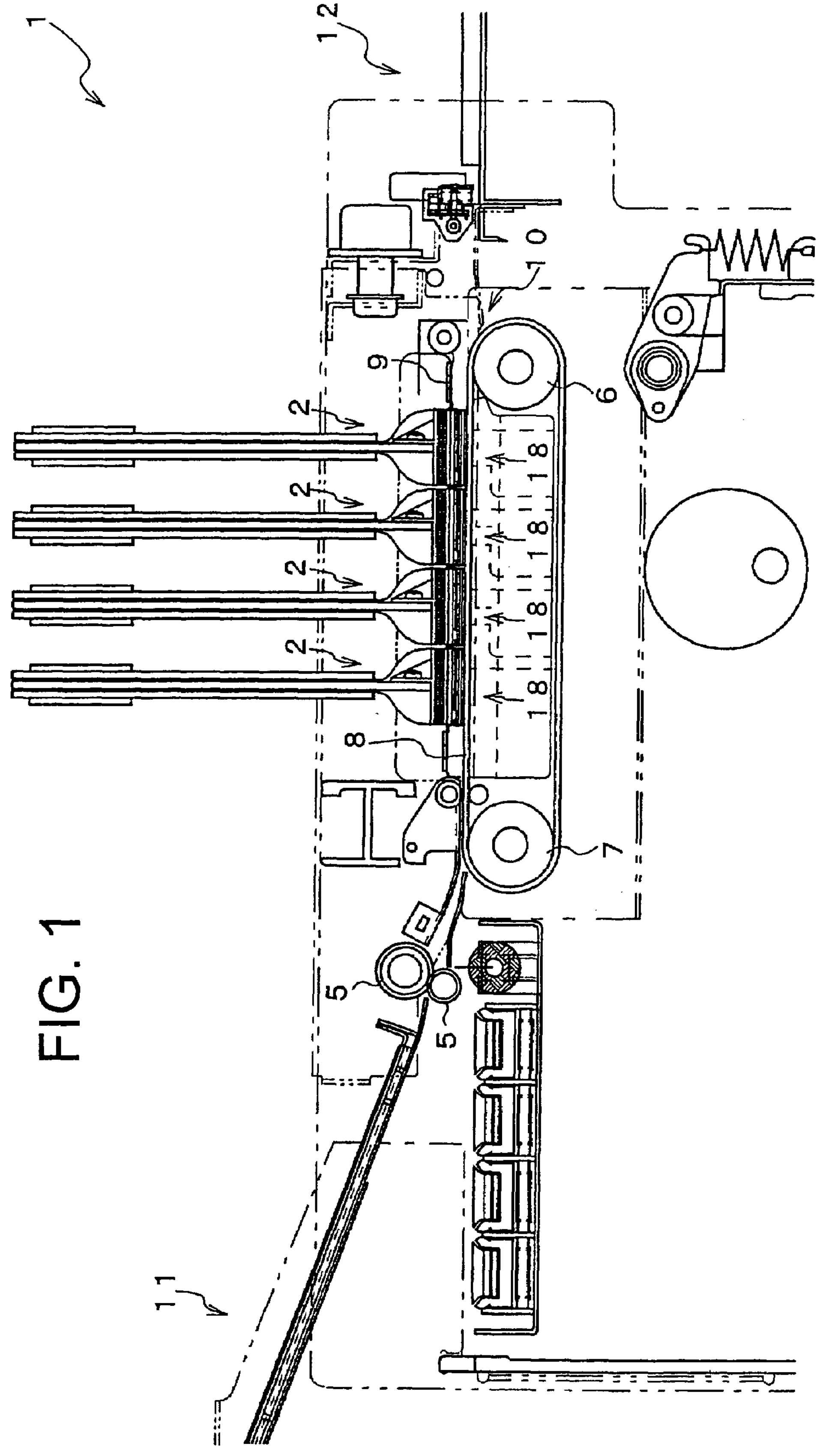
FIG. 1 is a view of an ink-jet printer equipped with print heads each of which includes a nozzle plate constructed according to a first embodiment of the invention.
Figure 2:
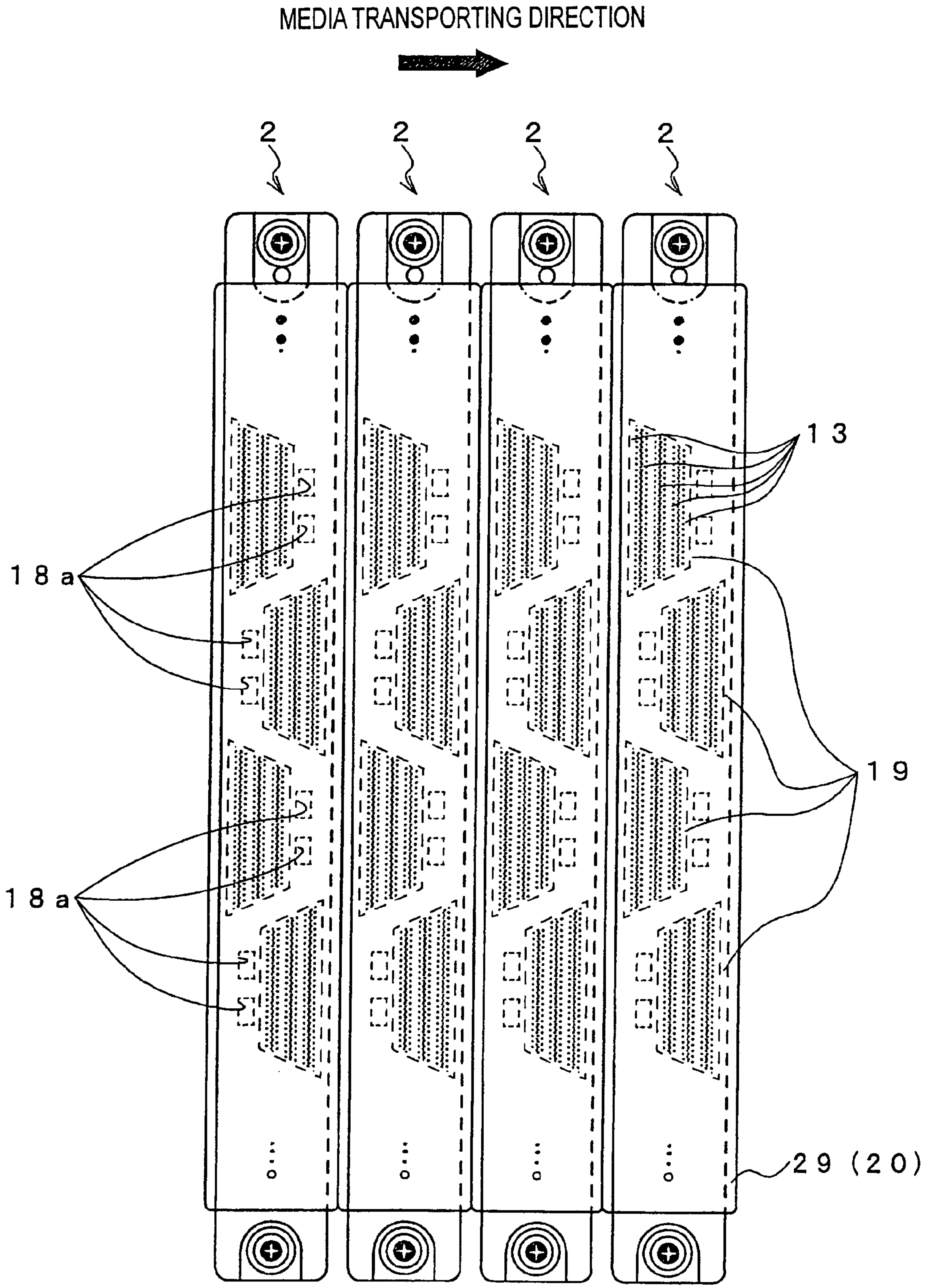
FIG. 2 is a bottom view of the print heads of the ink-jet printer of FIG. 1 which are arranged in a media transporting direction.
Figure 3:
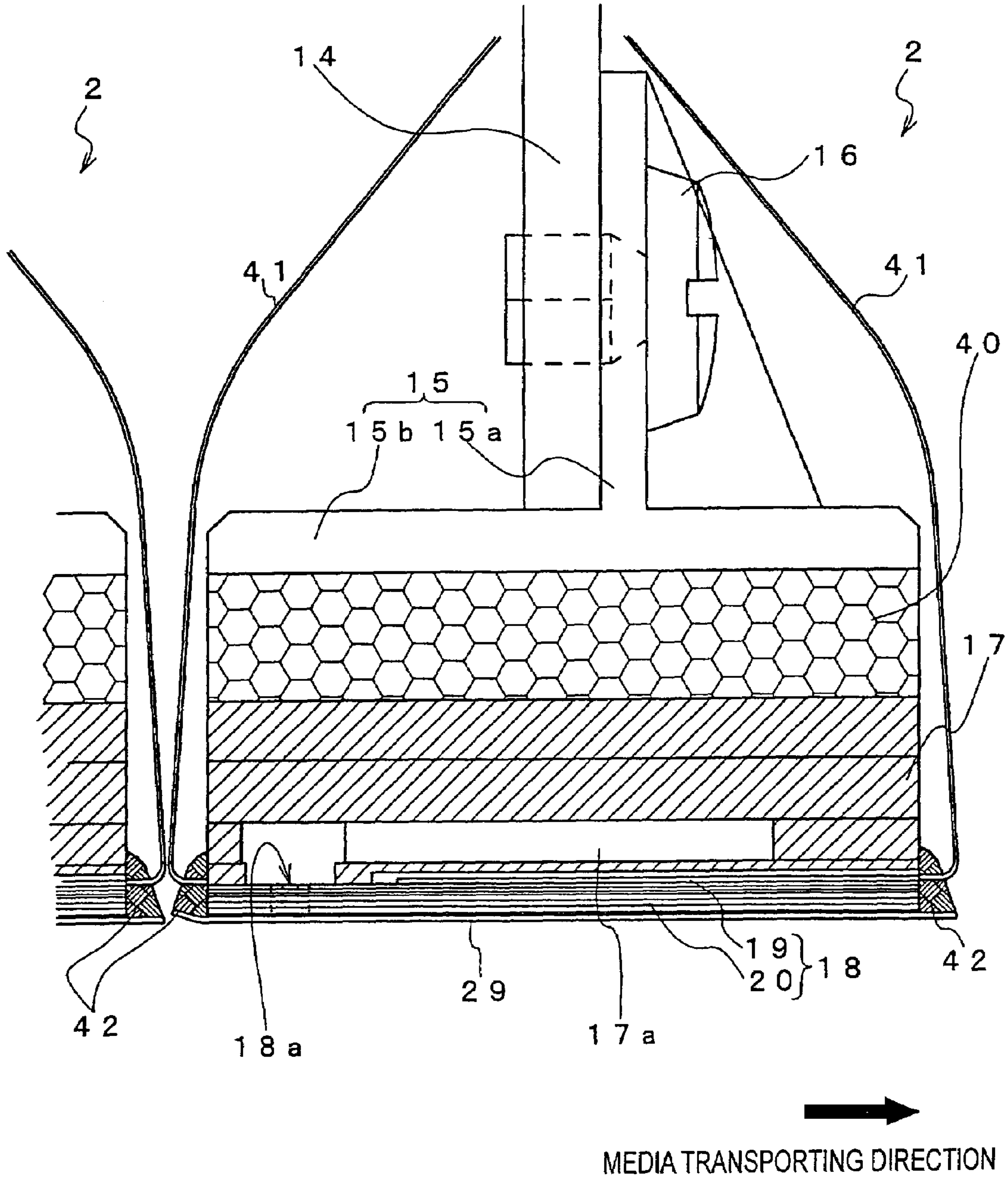
FIG. 3 is an enlarged view of one of the print heads of the ink-jet printer of FIG. 1.
Figure 4:
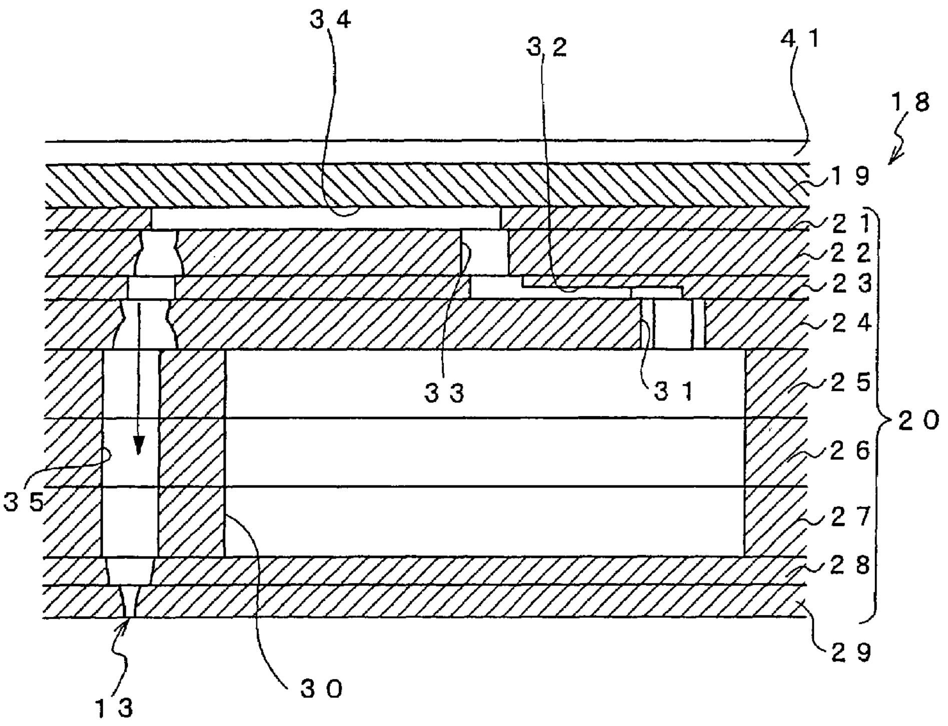
FIG. 4 is a cross sectional view of a laminated structure portion of the print head, showing a passage-defining unit which defines an ink passage.

Referring first to FIGS. 1–4, there will be described an ink-jet printer 1 equipped with four print heads 2 each of which includes a nozzle plate 29 constructed according to a first embodiment of the invention. FIG. 1 is a view showing almost the entirety of the ink-jet printer 1. FIG. 2 is a bottom view of the print heads 2 arranged in a media transporting direction. FIG. 3 is an enlarged view of one of the print heads 2. FIG. 4 is a cross sectional view of a laminated structure portion 18 of the print head 2 including a passage-defining unit 20.

The ink-jet printer 1, equipped with the four print heads 2, has a media entrance portion 11 and a media exit portion 12 which are respectively located in the left and right as seen in FIG. 1. A paper sheet as a print media is supplied through the media entrance portion 11, and is then transported to the media exit portion 12 by a media transport mechanism which is included in the printer 1.

The media transport mechanism of this printer 1 is constituted by a pair of media feeding rollers 5, 5 which are positioned on a downstream side of the media entrance portion 11, and a media conveyor belt 8 in the form of an endless belt which are wound on a driving pulley 6 and a driven pulley 7. The media feeding rollers 5, 5 cooperate with each other to feed the paper sheet in the rightward direction, i.e., toward the media conveyor belt 8. The paper sheet, fed by the rollers 5, 5 is mounted on a conveying surface which is provided by an upper flat portion of the endless belt 8, is then moved in the rightward direction with a circulating motion of the endless belt 8 in the clockwise direction (as seen in FIG. 1) as a result of rotation of the driving pulley 6. In this instance, the paper sheet is reliably held on the conveying surface, since the outer circumferential surface of the endless belt 8 is coated with a silicon coating which adheres to the paper sheet. Further, the paper sheet moved together with the circulating belt 8 is forced by a holding member 9, onto the conveying surface of the belt 8, so that the paper sheet adheres to the conveying surface without being upwardly displaced away from the conveying surface.

A media separator 10 is provided to be positioned on the downstream side of the media conveyor belt 8, for separating the paper sheet (arriving in the downstream end of the media conveyor belt 8) from the belt 8. The paper sheet thus separated from the belt 8 is moved toward the media exit portion 12.

The four print heads 2, serving to eject respective inks of four colors (magenta, yellow, blue and black), are arranged in a line parallel with a media transporting direction in which the paper sheet is transported by the above-described media transport mechanism. As shown in FIG. 2 which is the bottom view of the print heads 2, each of the print heads 2 provided by a generally rectangular body is elongated in a direction perpendicular to the media transporting direction. A lower portion of each print head 2 is provided by a laminated structure portion 18 having a lower surface in which a multiplicity of nozzle holes 13 each having a micro-sized diameter are open, so that the ink is downwardly ejected through the nozzle holes 13. The lower surface of the laminated structure 18 of the print head 2 is opposed to the conveying surface, i.e., the upper flat portion of the endless belt 8, with a small clearance therebetween which provides a media conveying channel. While the paper sheet conveyed by the media conveyor belt 8 passes right below the four print heads 2, the four print heads 2 eject the respective inks of the four colors through the nozzle holes 13 onto a print surface (i.e. upper surface) of the paper sheet, so that a desired color image is formed on the print surface of the paper sheet.

Each of the print heads 2 is attached to a member 14 (associated with a main body of the printer 1) through a holder 15 which has a vertically extending portion 15*a* and a horizontally extending portion 15*b* so as to have an inverted T shape, as shown in FIG. 3. The holder 15 is attached at its vertically extending portion 15*a* to the member 14 associated with the main body of the printer 1. To a lower surface of the horizontally extending portion 15*b* of the holder 15, there is attached the print head 2 constituted by a spacer portion 40, a base block portion 17 and the laminated structure portion 18 which are arranged in this order of description. In other words, the base block portion 17 and the laminated structure portion 18 are attached to the holder 15 via the spacer portion 40. The base block portion 17 consists of a plurality of plates superposed on one another, and has an ink delivery passage 17*a* formed therein. The ink supplied from an ink supply source (not shown) is delivered via the ink delivery passage 17*a* to an ink inlet 18*a* of the laminated structure portion 18.

The laminated structure portion 18 of each ink-jet head 2 consists of a passage-defining unit 20 in which a multiplicity of pressure chambers 34 and nozzle holes 13 are formed, and a plurality of actuator units 19 which are bonded to an upper surface of the passage-defining unit 20. As best shown in FIG. 4, the passage-defining unit 20 is provided by nine thin plates 21–29 each made of a stainless material. The thin plates 25–27 (i.e., the fifth through seventh plates as counted from the top of the passage-defining unit 20) cooperate with one another to define a manifold chamber 30 which communicates with the above-described ink inlet 18*a*. A communication hole 31 formed in the fourth plate 24 communicates the manifold chamber 30 and a restricted passage 32 which is formed in the third plate 23.

The restricted passage 32 communicates via a communication hole 33 formed in the second plate 22, with an end of the pressure chamber 34 formed in the first plate 21. Another end of the pressure chamber 34 communicates with a corresponding one of the nozzle holes 13 formed in the ninth plate (nozzle plate) 29, via a communication passage 35 formed through the second through eighth plates 22–28. The ink within the pressure chamber 34 is pressurized by activation of a corresponding one of the above-described actuator units 19, so that the pressurized ink is ejected through the corresponding one of the nozzle holes 13.

In the ink-jet print head 2 constructed as described above, the ink supplied from the ink supply source is delivered to the manifold chamber 30 via the ink delivery passage 17*a* and the ink inlet 18*a*, and is then delivered to the pressure chamber 34 via the communication hole 31, the restricted passage 32 and the communication hole 33. The ink within the pressure chamber 34 is pressurized by activation of the actuator unit 19, so that the pressurized ink is ejected through the nozzle hole 13 which communicates with the pressure chamber 34 via the communication passage 35.

The above-described manifold chamber 30, pressure chamber 34, restricted passage 32, communication holes 31, 33 and communication passage 35 are provided by the apertures which are formed in the thin plates 21–28 in etching operations. The nozzle hole 13 is provided by a through-hole which is formed through the nozzle plate in a press operation as described below in detail.

The actuator unit 19 is constituted by a plurality of a piezoelectric sheets each having a small thickness and made of PZT (lead zirconate titanate) ceramic material. The piezoelectric sheets are laminated on one another, with thin electrode films made of Ag—Pd metallic material being interposed among the piezoelectric sheets, such that deformable portions are provided for the respective pressure chambers 34. In this arrangement, each of the deformable portions of the actuator unit 19 is deformed to be convexed toward a corresponding one of the pressure chambers 34, when a predetermined value of voltage is applied between a corresponding pair of the electrodes. With the convexed deformation of the deformable portion of the actuator unit 19, a volume of the pressure chamber 34 is reduced whereby the ink within the pressure chamber 34 is pressurized to be ejected.

As shown in FIG. 3, flexible flat cables 41 extend curvedly from the laminated structure portion 18 in the upward direction. Each of the flat cables 41 is bonded at its end portion to an upper surface of the actuator unit 19 of the laminated structure portion 18, as shown in FIG. 4, so that the electrodes provided in the actuator unit 19 are electrically connected through wires arranged within the flat cable 41 to a driver IC (not shown) operable to control a printing operation. Reference numeral 42 denotes a silicon adhesive provided to cover a side surface of the laminated structure portion 18 and also a portion of the flat cable 41 contiguous to the end portion bonded to the upper surface of the actuator unit 19. Owing to the provision of the silicon adhesive, the contiguous portion of the flat cable 41 is protected against its excessive bending. Further, the silicon adhesive serves to seal the actuator unit 19, preventing entry of the ink or other substance to the actuator unit 19.

The nozzle plate 29, which is provided by the lowermost one of the nine thin plates 21–29 of the passage-defining unit 20, is coated at its lower surface with a non-wetting plating layer. The non-wetting plating layer is formed to cover the entirety of the lower surface of the nozzle plate 29, namely, cover even portions of the lower surface each of which is adjacent to the opening of a corresponding one of the nozzle holes 13, so that the ejected ink is advantageously prevented from adhering to the opening of the nozzle hole 13, thereby avoiding clogging of the nozzle hole 13 with the ink accumulated in the opening of the nozzle hole 13. It is noted that the lower surface of the nozzle plate 29 (which is one of opposite surfaces that is to be opposed to a print media) may be referred also to as an outside surface, while the upper surface of the nozzle plate 29 may be referred to as an inside surface since the upper surface of the nozzle plate 29 is held in contact with the thin plate 28 rather than being exposed to the exterior.

There will be described various processes of forming a non-wetting plating layer on the nozzle plate 29, by way of examples. In each of the below-described processes, the formation of the non-wetting plating layer on the nozzle plate 29 is made before the nozzle plate 29 and the other thin plates 21–28 are laminated on and bonded to one another.

Figure 5:
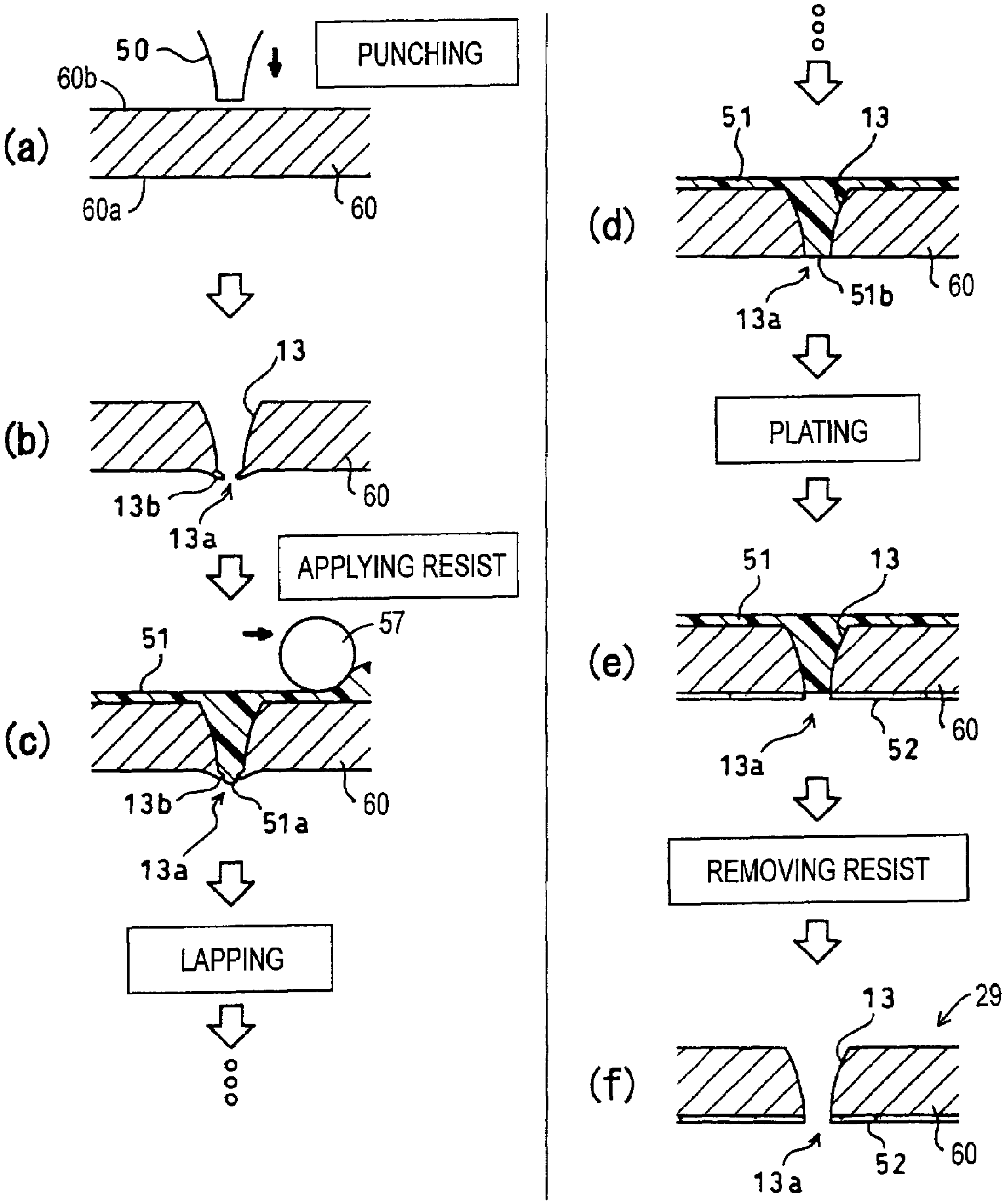
FIGS. 5(*a*)–5(*f*) are views showing a process of manufacturing the nozzle plate.

FIG. 5 shows one of the processes of the formation of the non-wetting plating layer on the nozzle plate 29. The process is initiated with a through-holes forming step of forming through-holes as the nozzle holes 13 in a substrate 60 made of a stainless material. This nozzle-holes forming step is implemented by effecting a press operation in which an upper die having a multiplicity of protrusions 50 is employed. Each of the protrusions 50 serving as a piercing punch in the press operation is configured to form a desired shape of the nozzle hole 13, and has a generally conical shape so that the formed hole 13 consists of a tapered hole. Each of the through-holes 13 is formed by piercing the substrate 60 from its inside surface 60*b* toward its outside surface 60*a*, as shown at (a) and (b) of FIG. 5. In this instance, an amount of the downward displacement of the upper die relative to the substrate 60 or a lower die is adjusted suitably for assuring a suitable amount of engagement of each piercing punch 50 with the substrate 60. It is noted that the substrate 60 has a thickness of 50–75 μm while each nozzle hole 13 has a diameter of about 15–20 μm as measured at its smallest portion (at its opening on the outside surface 60*a*).

The through-holes forming step is followed by a masking step implemented for masking surfaces of the substrate 60 which are not to be coated with the non-wetting plating layer. The masking step includes a substrate degreasing step, an insulating-material disposing step, a bar coating step and an insulating-material curing step. The substrate degreasing step is first implemented to degrease the substrate 60, by immersing the substrate 60 in a suitable alkali solution. The insulating-material disposing step is then implemented to dispose a thermal cure resist 51 as an insulating material, on the inside surface 60*b* of the substrate 60. The bar coating step is implemented according to a so-called "bar coating" method in which a bar 57 is fed or moved on the resist 51 disposed on the inside surface 60*b*, at a feed rate of about 10–60 mm/s in a direction parallel to the inside surface 60*b*, as shown at (c) of FIG. 5, such that portions 51*a* of the resist 51 protrude outwardly from openings 13*a* of the nozzle holes 13 on the outside surface 60*a* of the substrate 60. During the movement of the bar 57 relative to the substrate 60, a distance between the bar 57 and the substrate 60 is held constant. The above-described feed rate, a viscosity of the resist 51 and an amount of the thermal cure resist 51 (to be disposed on the inside surface 60*b* in the insulating-material disposing step) are suitably adjusted such that each of the above-described portions 51*a* of the resist 51 protrudes from the corresponding opening 13*a* by 1–5 μm.

In the bar coating step, since each nozzle hole 13 takes the form of the through-hole, an air can be discharged from each nozzle hole 13 via the opening 13*a*, upon the charging of each nozzle hole 13 with the resist 51, so that the inner surface of each nozzle hole 13 can be reliably masked with the resist 51. The bar coating step is followed by the insulating-material curing step in which the substrate 60 is left under a high temperature of 100° C. for a few minutes whereby the resist 51 is cured.

The masking step is followed by a surface smoothing step which is implemented to smooth the outside surface 60*a* of the substrate 60. That is, the outside surface 60*a* of the substrate 60 is subjected to a polishing or lapping operation for eliminating burrs 13*b* which have been inevitably formed at an edge of the opening 13*a* of each through-hole 13 in the press operation of the through-holes forming step. Further, in the lapping operation, the portions 51*a* of the applied resist 51 protruding outwardly from the openings 13*a* of the through-holes 13 are eliminated together with the burrs 13*b*. By eliminating the protruding portions 51*a* of the resist 51 in the lapping operation, flat end surfaces 51*b* of the resist 51 are formed such that each of the flat end surfaces 51*b* is flush with the outside surface 60*a* of the substrate 60, as shown at (d) of FIG. 5. Thus, the resist 51 accommodated in each through-hole 13 is neither recessed nor protruded from the opening 13*a* of the through-hole 13, namely, from the outside surface 60*a* of the substrate 60. Therefore, the inner surface of each nozzle hole 13 is completely masked, even at its portion adjacent to the corresponding opening 13*a*, with the resist 51, while the outside surface 60*a* of the substrate 60 is completely unmasked or exposed even at its portion adjacent to the corresponding opening 13*a*.

The surface smoothing step is followed by a non-wetting layer forming step which is implemented to form a non-wetting layer on the outside surface 60*a* of the substrate 60. In this non-wetting layer forming step, the substrate 60 is first subjected to an acid activation in which the substrate 60 is immersed in a nitrate aqueous solution. Then, strike Ni plating is applied to the substrate 60, for assuring a sufficiently high degree of adhesion of the non-wetting layer to the substrate 60 which is made of stainless steel. In this instance, sulfamic acid Ni plating, in addition to the strike Ni plating, may be applied to the substrate 60, if necessary. The non-wetting layer forming step is completed by forming the non-wetting layer in the form of a water-repellent plating layer 52 on the outside surface 60*a* of the substrate 60, as shown at (e) of FIG. 5. In the present embodiment, the water-repellent plating layer 52 is formed of Ni-PTFE (Poly Tetra Fluoro Ethylene), and has a thickness of 0.5–3.0 μm.

While the water-repellent plating layer 52 is formed on the outside surface 60*a* of the substrate 60, the water-repellent plating layer 52 is not formed on the inside surface 60*b* and the inner surface of each nozzle hole 13 which are masked with the resin 51. The masking of the inside surface 60*b* of the substrate 60 with the resin 51 is effective to permit the substrate 60 or the nozzle plate 29 to be satisfactorily bonded at the inside surface to the other plate (specifically, the eighth plate 28) with an adhesive, because the nozzle plate 29 could not be satisfactorily bonded at the inside surface to the other plate with a sufficiently high degree of bonding strength if the inside surface of the nozzle plate 29 were covered with the water-repellent plating layer. Further, the masking of the inner surface of the nozzle hole 13 with the resin 51 is effective to reliably form a desired-shaped meniscus of the ink at the opening of the nozzle hole 13, because the desired-shaped meniscus could not be formed due to considerable reduction of the wettablity of the inner surface of the nozzle hole 13 if the inner surface of the nozzle hole 13 were covered with the water-repellent plating layer.

As described above, in the masking step, the inner surface of each nozzle hole 13 is completely masked even at its portion adjacent to the corresponding opening 13*a*, while the outside surface 60*a* of the substrate 60 is completely unmasked or exposed even at its portion adjacent to the corresponding opening 13*a*. In the non-wetting layer forming step, the water-repellent plating layer 52 is formed to cover the exposed outside surface 60*a* of the substrate 60 including the portions of the outside surface 60*a* each of which is adjacent to the opening 13*a* of the corresponding nozzle hole 13, without an erroneous formation of the layer 52 on the inner surface of each nozzle hole 13. Therefore, the ink ejected from the nozzle holes 13 is reliably prevented from adhering to the edge of the opening 13*a* of each nozzle hole 13, thereby avoiding clogging of the nozzle hole 13 with the ink accumulated in the opening of the nozzle hole 13, and accordingly avoiding deterioration in the quality of printed images without necessity of frequent cleaning of the ink-jet print head. Further, since the water-repellent plating layer 52 does not cover any portion of the inner surface of each nozzle hole 13, the wettability of the inner surface of each nozzle hole 13 is well maintained whereby deterioration in accuracy of ejection of the ink is avoided.

The non-wetting layer forming step is followed by an unmasking step in which the resist 51 is removed from the substrate 60, by immersing the substrate 60 in an aqueous solution of sodium hydroxide for about 10 minutes. In this instance, it is preferable that the substrate 60 immersed in the aqueous solution of sodium hydroxide is subjected to an ultrasonic vibration, for facilitating the removal of the resist 51 from the substrate 60.

The unmasking step is followed by a cleaning step of cleaning the substrate 60. In this cleaning step, after the substrate 60 has been heated at a temperature of 300–400° C., the substrate 60 is subjected to an ultrasonic cleaning or other kind of water cleaning for cleaning debris of the resist 51 which remain, for example, inside each of the nozzle holes 13.

With implementations of the above-described steps, the nozzle plate 29 shown at (f) of FIG. 5 is obtained. The thus obtained nozzle plate 29 and the other thin plates 21–28 are laminated on and bonded to one another, for providing the passage-defining unit 20.

Figure 6:
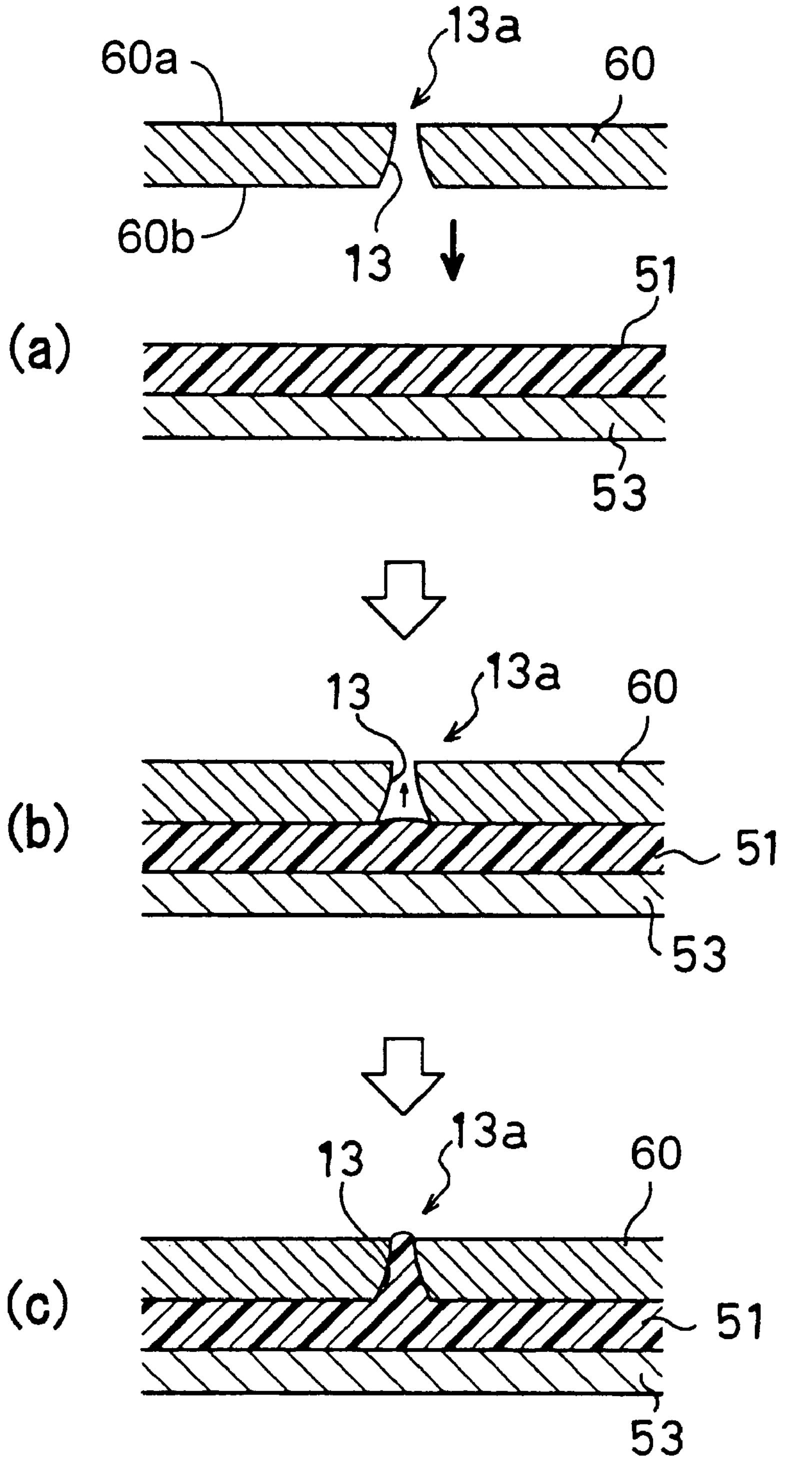
FIGS. 6(*a*)–6(*c*) are views showing another process of manufacturing the nozzle plate, particularly, illustrating a masking step of charging each nozzle hole with a resist.

FIG. 6 illustrates another process of the formation of the non-wetting plating layer on the nozzle plate 29. Like the above-described process illustrated by FIG. 5, the process is initiated with a through-holes forming step of forming through-holes as the nozzle holes 13 in the substrate 60, by effecting a press operation. The through-holes forming step is followed by a surface smoothing step, so that the burrs formed at the edge of the opening 13*a* of each through-hole 13 are eliminated by a polishing or lapping operation.

The surface smoothing step is followed by a masking step that is different from the masking step of the above-described manufacturing process illustrated by FIG. 5. In the masking step of the present manufacturing process, a resist is first applied to a suitable flat plate 53, so that the resist layer 51 having a predetermined thickness is formed on the flat plate 53. Then, the substrate 60, which has been subjected to a degreasing treatment, is superposed on the resist layer 51 such that the inside surface 60*b* is brought into contact with the resist layer 51 while the outside surface 60*a* faces upwardly, as shown at (a) of FIG. 6.

As shown at (b), (c) of FIG. 6, a portion of the resist layer 51, which is positioned right below each of the nozzle holes 13, is drawn up into the nozzle hole 13 owing to a capillary action of the resist 51. Thus, each nozzle hole 13 is filled with the resist 51, such that a top end of the drawn portion of the resist 51 slightly protrudes from the opening 13*a* of the corresponding nozzle hole 13 on the outside surface 60*a* of the substrate 60. In this instance, the drawn portion of the resist 51 does not cover the outside surface 60*a*, since the capillary action of the resist 51 occurs only in a narrow space, i.e., in a space within each nozzle hole 13. Therefore, the outside surface 60*a* of the substrate 60 is left exposed even at its portion adjacent to the opening 13*a* of each nozzle hole 13, while the inner surface of each nozzle hole 13 is completely masked even at its portion adjacent to the corresponding opening 13*a*. It is noted that the capillary action of the resist 51 depends greatly upon the viscosity of the resist 51 and the diameter of each nozzle hole 13. In this sense, the viscosity of the resist 51 is adjusted such that the resist 51 is drawn up by a suitable distance.

The masking step is followed by a non-wetting layer forming step, an unmasking step and a cleaning step, which are the same as those of the above-described process of FIG. 5. With implementations of these steps, the nozzle plate 29 as shown at (f) of FIG. 5 is obtained. The water-repellent plating layer 52 is thus formed to cover the entirety of the outside surface 60*a* of the substrate 60 including the portions of the outside surface 60*a* each of which is adjacent to the opening 13*a* of the corresponding nozzle hole 13, thereby making it possible to minimize a risk of clogging of each nozzle hole 13 of the manufactured nozzle plate 29.

Figure 7:
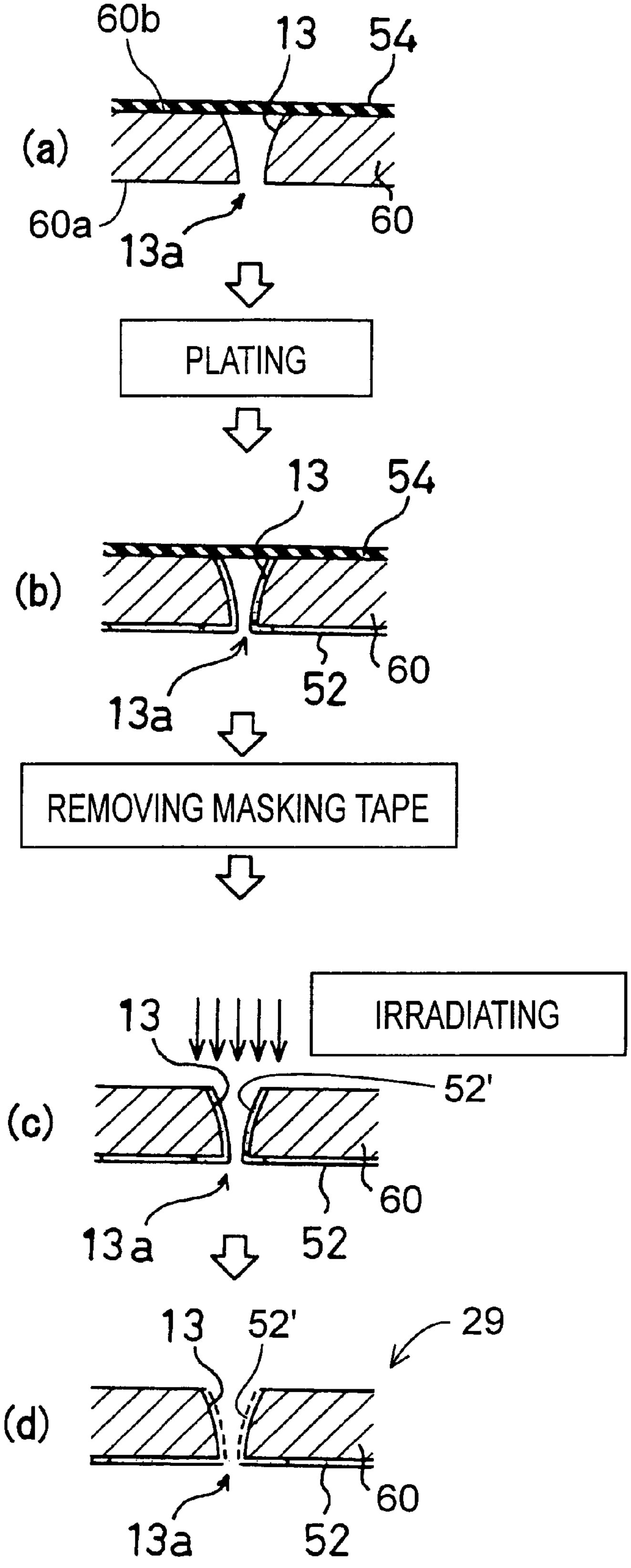
FIGS. 7(*a*)–7(*d*) are views showing still another process of manufacturing the nozzle plate, particularly, illustrating an irradiating step of irradiating a portion of anon-wetting layer which portion covers an inner surface of each nozzle hole.

FIG. 7 illustrates still another process of the formation of the non-wetting plating layer on the nozzle plate 29. Like the above-described processes illustrated by FIGS. 5 and 6, the process is initiated with a through-holes forming step of forming through-holes as the nozzle holes 13 in the substrate 60, by effecting a press operation. The through-holes forming step is followed by a surface smoothing step, so that the burrs formed at the edge of the opening 13*a* of each through-hole 13 are eliminated by a polishing or lapping operation. The surface smoothing step is followed by a masking step that is different from the masking step of the processes of FIGS. 5 and 6. In the masking step of the present process, the inside surface 60*b* of the substrate 60 is covered with a masking tape 54, as illustrated at (a) of FIG. 7. The masking step is followed by a non-wetting layer forming step that is the same as that of the above-described process of FIG. 5. As a result of the implementation of the non-wetting layer forming step, the inner surface of each nozzle hole 13 as well as the outside surface 60*a* is coated with the water-repellent plating layer 52, as shown at (b) of FIG. 7, since the inner surface of each nozzle hole 13 as well as the outside surface 60*a* is not masked with the masking tape 54.

The non-wetting layer forming step is followed by an unmasking step, whereby the masking tape 54 is removed from the substrate 60. Then, an irradiating step is implemented to irradiate exclusively portions 52' of the water-repellent plating layer 52 which cover the inner surfaces of the nozzle holes 13, with a high-energy radiation such as laser and plasma. The irradiated portions 52' of the water-repellent plating layer 52 which cover the inner surfaces of the nozzle holes 13 are heated by the high-energy radiation applied from the upper side of the substrate 60 (as seen in FIG. 7), i.e., from one of the opposite sides of the substrate 60 that is remote from the outside surface 60*a* of the substrate 60. Since the water-repellent plating layer 52 formed of Ni-PTFE loses its non-wetting characteristic when heated up to 400° C. or more, the irradiated portions 52' of the water-repellent plating layer 52 have a wetting characteristic after heated by the high-energy radiation. During the application of the high-energy radiation to the portions 52' of the water-repellent plating layer 52, the direction or angle of the application of the high-energy radiation is varied such that the entirety of each of the portions 52' (including its portion adjacent to the corresponding opening 13*a*) is evenly heated whereby the entirety of each portion 52' loses the wetting characteristic.

Since the high-energy radiation is applied to the portions 52' of the water-repellent plating layer 52 from the side of the substrate 60 remote from the outside surface 60*a* of the substrate 60, the outside surface 60*a* is not irradiated with the high-energy radiation, whereby the non-wetting characteristic of a portion of the water-repellent plating layer 52 covering the outside surface 60*a* is maintained. Thus, it is possible to minimize a risk of clogging of each nozzle hole 13 of the manufactured nozzle plate 29.

Figure 8:
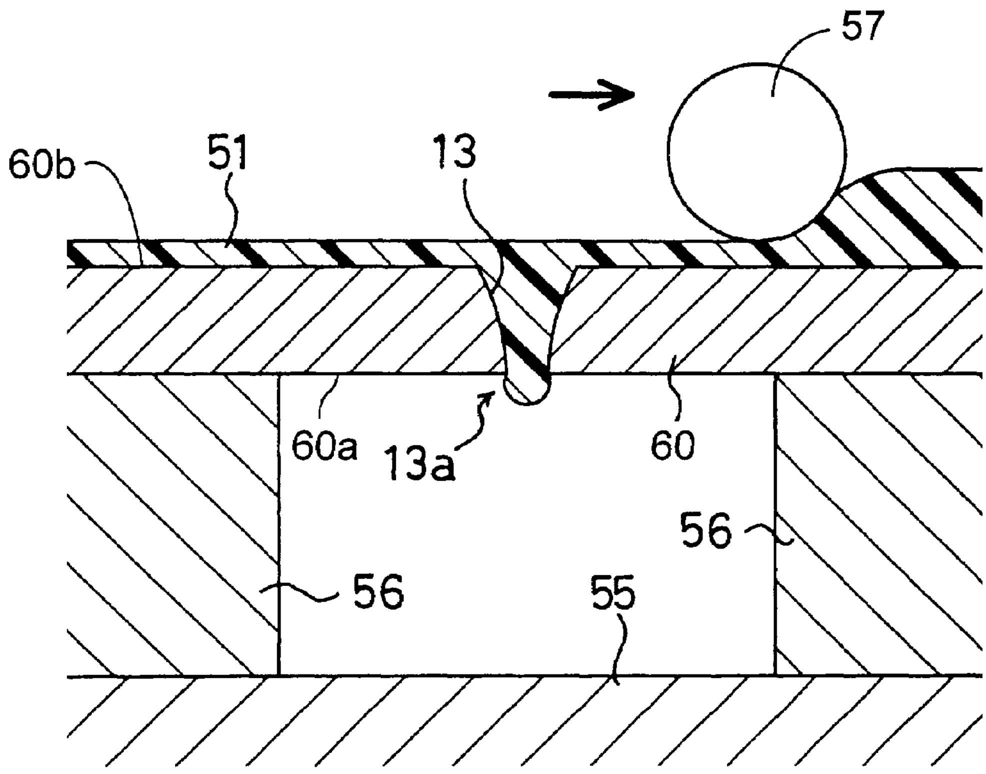
FIG. 8 is a view showing still another process of manufacturing the nozzle plate, particularly, illustrating a masking step of applying a resist on the inside surface and charging each nozzle hole with the resist in accordance with a bar coating method.

FIG. 8 illustrates still another process of the formation of the non-wetting plating layer on the nozzle plate 29. Like the above-described process illustrated by FIG. 6, the process is initiated with a through-holes forming step, and a surface smoothing step is then implemented. That is, through-holes are formed as the nozzle holes 13 in the substrate 60 by effecting a press operation, and then the burrs are eliminated by a polishing or lapping operation.

The surface smoothing step is followed by a substrate setting step which is implemented to set the substrate 60 above a base 55 such that the outside surface 60*a* is positioned downwardly of the inside surface 60*b*. In this instance, spacer members 56 are provided to be interposed between the substrate 60 and the base 55, such that the opening 13*a* of each nozzle hole 13 on the outside surface 60*a* is spaced apart from the base 55 by a predetermined distance. The spacer members 56 are positioned relative to the substrate 60 such that the openings 13*a* of the nozzle holes 13 are not closed by the spacer members 56. It is noted that the base 55 and the spacer members 56 cooperate with each other to constitute a support. The support has a large height portion provided by a portion in which one of the spacer members 56 is superposed on the base 55, and a small height portion provided by a portion in which none of the spacer members 56 is superposed on the base 55. That is, the substrate 60 is set on the support such that the substrate 60 is supported by the large height portion while each of the openings 13*a* of the nozzle holes 13 is positioned above the small height portion.

A masking step is then implemented to apply the resist 51 on the upper surface, i.e., the inside surface 60*b* of the substrate 60 and fill each of the nozzle holes 13 with the resist 51, as in the above-described process of FIG. 5. The masking step includes an insulating-material disposing step of disposing the resist 51 as the insulating material on the inside surface 60*b* of the substrate 60, and a bar coating step of disposing the bar 57 on the resist 51 disposed on the inside surface 60*b* and moving the bar 57 or the substrate 60 relative to the other in a direction parallel to the inside surface 60*b* at a predetermined feed rate such that portions 51*a* of the resist 51 protrude outwardly from the openings 13*a* of the nozzle holes 13. In the bar coating step, the feed rate, the viscosity of the resist 51 and the amount of the thermal cure resist 51 (to be disposed on the inside surface 60*b* in the insulating-material disposing step) are suitably adjusted such that each of the portions 51*a* of the resist 51 protrudes from the corresponding opening 13*a* by 1–5 μm.

Since the openings 13*a* of the nozzle holes 13 are spaced apart from the base 55, the outwardly protruding portions 51*a* of the resist 51 are prevented from being adhering to the outside surface 60*a* of the substrate 60, thereby avoiding an erroneous masking of the outside surface 60*a* with the resist 51, and accordingly eliminating necessity of execution of a lapping operation which would be required if the outside surface 60*a* were partially covered with the resist 51. Therefore, the outside surface 60*a* of the substrate 60 is left exposed even at its portion adjacent to the opening 13*a* of each nozzle hole 13, while the inner surface of each nozzle hole 13 is completely masked even at its portion adjacent to the corresponding opening 13*a*.

The masking step is followed by a non-wetting layer forming step, an unmasking step and a cleaning step, which are the same as those of the above-described process of FIG. 5. With implementations of these steps, the nozzle plate 29 as shown at (f) of FIG. 5 is obtained. The water-repellent plating layer 52 is thus formed to cover the entirety of the outside surface 60*a* of the substrate 60 including the portions of the outside surface 60*a* each of which is adjacent to the opening 13*a* of the corresponding nozzle hole 13, thereby making it possible to minimize a risk of clogging of each nozzle hole 13 of the manufactured nozzle plate 29.

Figure 9:
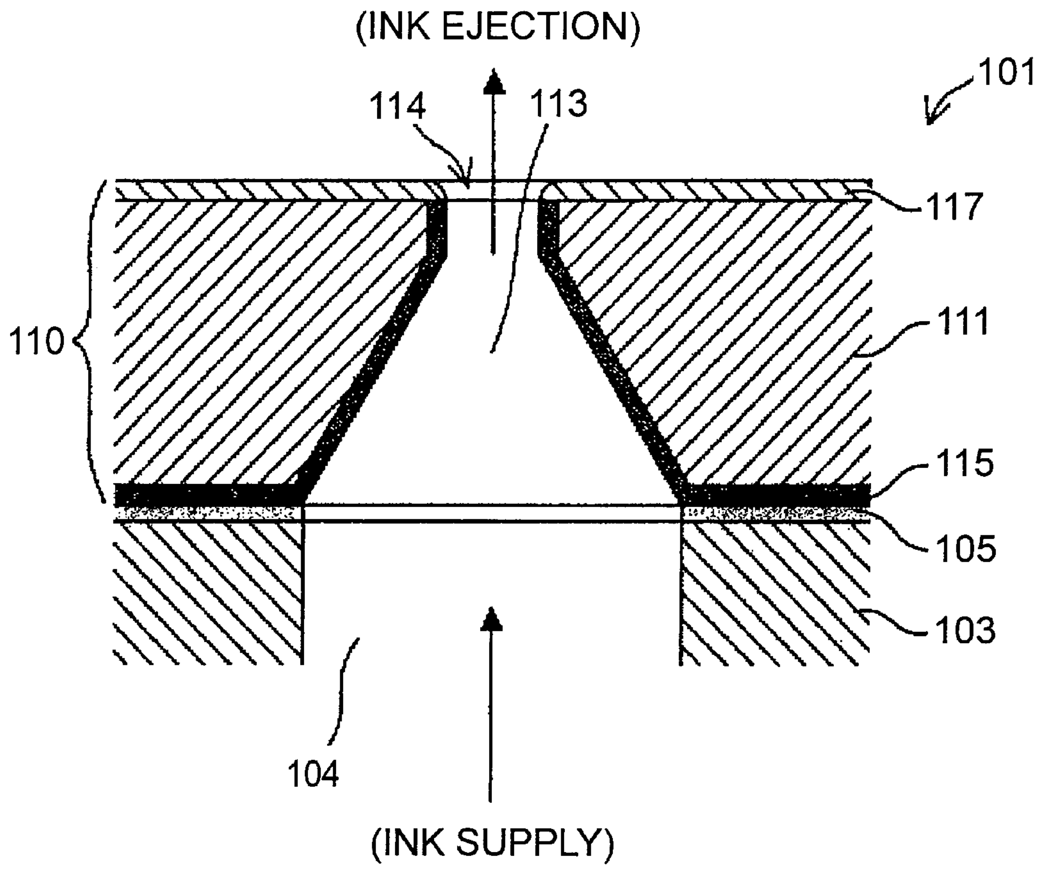
FIG. 9 is a cross sectional view of a nozzle plate constructed according to a second embodiment of the invention.
Figure 10:
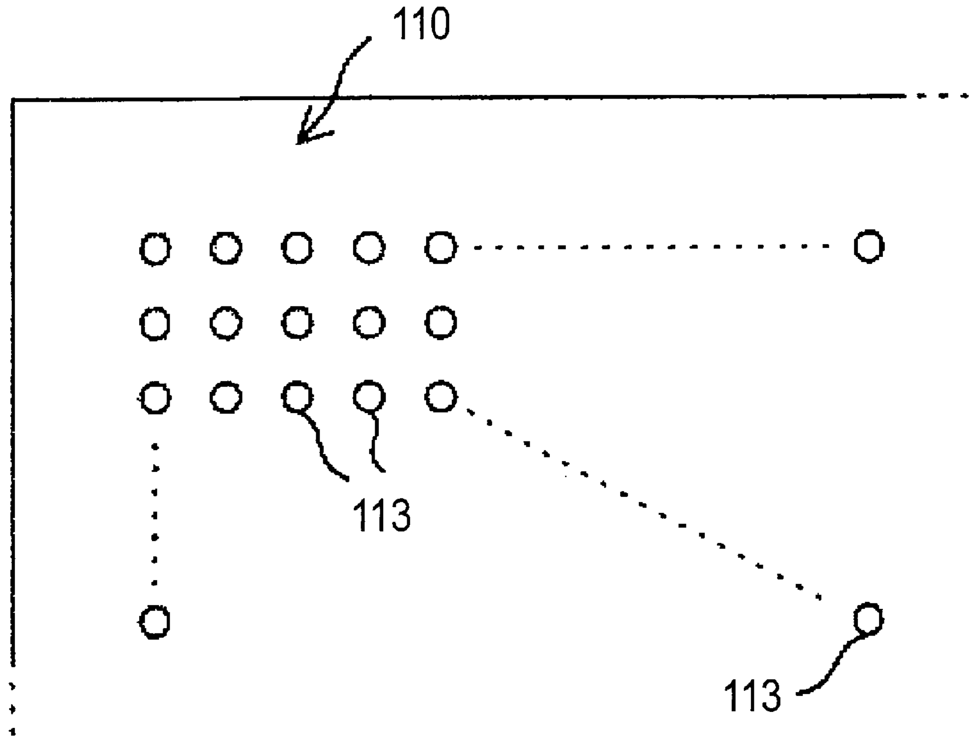
FIG. 10 is a bottom view showing the nozzle plate of FIG. 9.

Referring next to FIGS. 9–10, there will be described an ink-jet print head 101 constructed according to another embodiment of the invention. FIG. 9 is a cross sectional view showing a nozzle plate 110 which is attached to a head body 103 of the ink-jet print head 101. FIG. 10 is a plan view of the nozzle plate 110.

The nozzle plate 110 is provided by a substrate 111 made of a stainless steel and having a multiplicity of nozzle holes 113 through which an ink is to be ejected toward a print media. The nozzle plate 110 is bonded at its inside surface to the head body 103 by an adhesive 105, such that each of the nozzle holes 113 is positioned to be aligned with an ink passage 104 formed in the passage-defining unit of the ink-jet print head 101. The head body 103 is constructed to include the passage-defining unit which defines the ink passages 104 communicating the nozzle holes 113 with pressure chambers (not shown), and actuator units (not shown) which pressurize the ink within the pressure chambers. Since such a construction of the head body 103 is well known in the art, no redundant description of the head body 103 will be provided.

As shown in FIG. 9, the substrate 111 is coated with a covering layer in the form of an insulating layer 115 which is made of silicon dioxide ($SiO_2$) having a certain degree of hydrophilicity or wettability. Described specifically, the substrate 111 having a thickness of 50–75 μm is coated, at its inside surface and an inner surface of each nozzle hole 113, with the insulating layer 115 having a thickness of 0.3–5.0 μm. Further, the substrate 111 is coated at its outside surface with a water-repellent layer 117 in the form of a eutectoid plating layer containing a fluorine. The water-repellent layer 117 has the same thickness as the insulating layer 115.

In the ink-jet print head 101 constructed as described above, the ink within the pressure chamber is pressurized by activation of the actuator unit, so that the pressurized ink is supplied to the nozzle hole 113 through the ink passage 104. The supplied ink is then ejected from an opening 114 of the nozzle hole 113 toward a print media, so that a desired image is formed on the print media.

Figure 11:
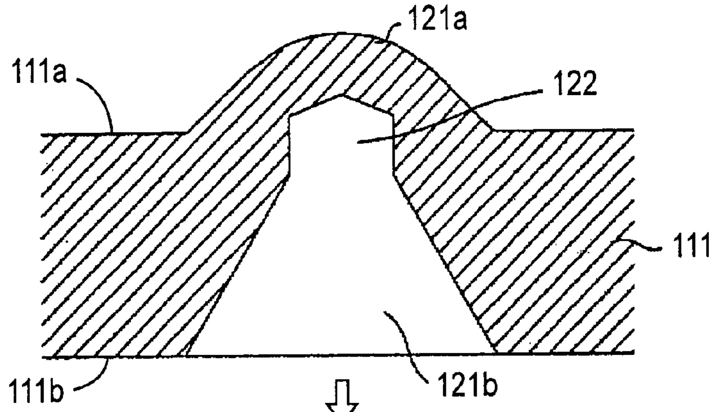
FIGS. 11(*a*)–11(*d*) are views showing a process of manufacturing the nozzle plate of FIG. 9.
Figure 11:
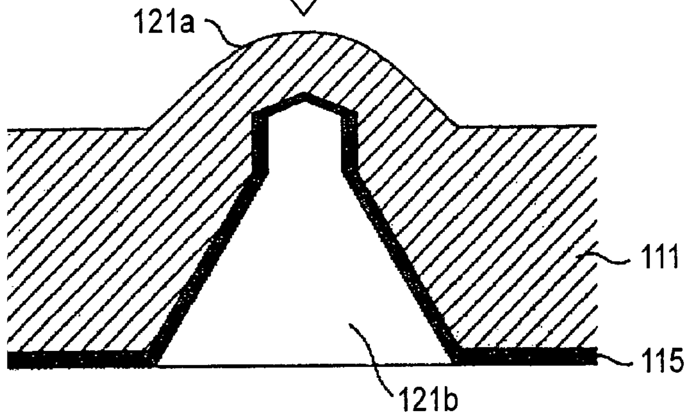
Figure 11:
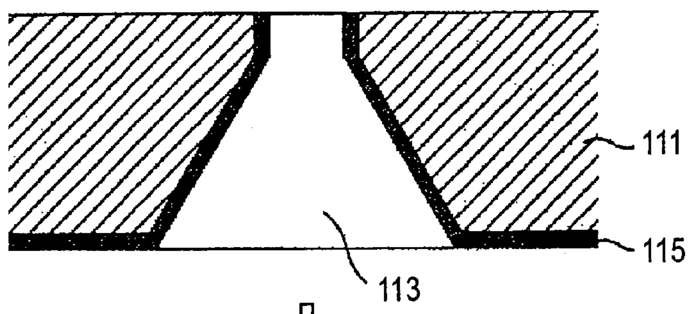
Figure 11:
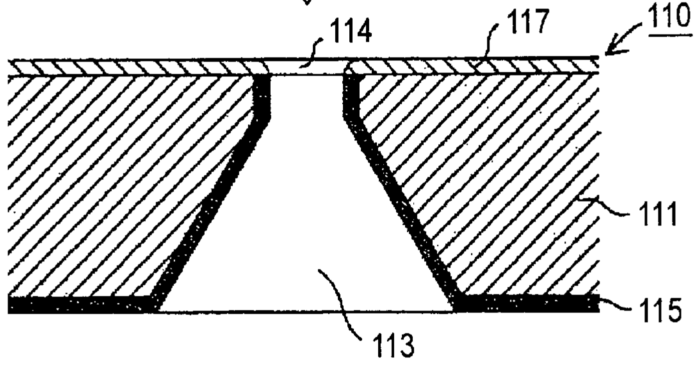

The nozzle plate 110 can be manufactured in a process, as shown in FIG. 11 by way of example. This process includes a deforming step, a covering-layer forming step, a surface smoothing step and a non-wetting-layer forming step, which are illustrated at (a), (b), (c) and (d) of FIG. 11, respectively. It is noted that the substrate 111 for the nozzle plate 110 may be provided by a flat plate made of a stainless steel, so that the substrate 111 can be subjected to an electrolytic plating without the substrate 111 being coated with a conductive coating.

The process is initiated with the deforming step of plastically deforming portions of the substrate 111 in which the nozzle holes 113 are to be formed, in a direction away from the inside surface 111*b* toward the outside surface 111*a*. In this instance, a suitable punch is used to plastically deform each of the above-described portions of the substrate 111 such that a recess 121*b* and a protrusion 121*a* are concurrently formed in the inside and outside surfaces 111*b*, 111*a* of each of the portions of the substrate 111, respectively, and such that the recess 121*b* has a depth not smaller than the thickness of the substrate 111, as illustrated at (a) of FIG. 11.

The recess 121*b* has a distal end portion 122 having a relatively small diameter, and a tapered portion contiguous to the distal end portion 122. The taped portion of the recess 121*b* has a diameter gradually increasing as viewed in a direction away from the outside surface 111*a* toward the inside surface 111*b*. The deforming step is followed by a cleaning step of cleaning the entirety of the substrate 111 by, for example, an ultrasonic cleaning.

The covering-layer forming step is then implemented to form the insulating layer 115 as a covering layer on the inside surface 111*b* and the inner surface of the recess 121*b*. The insulating layer 115 is made of silicon dioxide ($SiO_2$) containing carbon. It is noted that the insulating layer 115 may be formed in a wet-forming or dry-forming method such as known PVD (physical vapor deposition) method and CVD (chemical vapor deposition) method.

Where the CVD method is adopted, the insulating layer 115 is formed at a low temperature (e.g., 150° C.) under an atmosphere of mixed gas including TEOS (tetraethoxy orthosilicate: $Si(OC_2H_5)_4$) and argon (Ar), so that the thin layer made of silicon dioxide containing carbon is formed as the insulating layer 115 the substrate 111.

It is common that formation of an insulating layer is made at a high temperature (e.g., 300° C.) by using TEOS and gaseous oxygen. However, the insulating layer formed at such a high temperature is likely to have a high degree of membrane stress in addition to a high degree of insulation performance. In the present embodiment in which the insulating layer 115 is formed at a relatively low temperature as describe above, the insulating layer 115 has a low degree of membrane stress, so that the insulating layer 115 is not undesirably removed from the substrate 111 in the surface smoothing step following the insulating-layer forming step. It is noted that the insulating layer 115 formed at such a relatively low temperature exhibits a withstand voltage of 2–3 MV/cm.

In the surface smoothing eliminating step, the protrusions 121*a* protruding from the outside surface 111*a* are eliminated by polishing, lapping, grinding or otherwise machining the outside surface 111*a* in a known manner. With the elimination of the protrusions 121*a*, the recesses 121*b* (each having the depth not smaller than the thickness of the substrate 111) convert into the respective nozzle holes 113, as illustrated at (c) of FIG. 11. The surface smoothing step is followed by the non-wetting-layer forming step for forming the water-repellent layer 117 in the form of an eutectoid plating layer containing a fluorine. The non-wetting-layer forming step is implemented in an electrolytic plating operation in which the substrate 111 to be plated is made an electrode and suspended in a solution containing fluororesin particles.

In the electrolytic plating operation of the non-wetting-layer forming step, the substrate 111 is immersed in a nickel solution in which molecules of PTFE (poly tetra fluoro ethylene) are dispersed. The water-repellent layer 117 can be deposited on a selected surface of the substrate 111, i.e., on the outside surface 111*a* which is not masked by the insulating layer 115 in the form of the thin film made of silicon dioxide ($SiO_2$).

Since the water-repellent layer 117 consisting of the eutectoid plating layer grows in an isotropic manner, the water-repellent layer 117 is formed to have the same thickness as the insulating layer 115 which has been formed on the inside surface 111*b* and the inner surface of the recess 121*b* in the insulating-layer forming step. That is, in the non-wetting-layer forming step, the thickness of the formed water-repellent layer 117 is adjusted such that the water-repellent layer 117 does not overhang each of the nozzle holes 113, namely, such that the water-repellent layer 117 does not project from the inner surface of each nozzle hole 113 toward the axis of the nozzle hole 113.

The preparation of the nozzle plate 110 is completed with the completion of the non-wetting layer forming step. The completed nozzle plate 110 is bonded at its inside surface to the head body 103 by the adhesive 105 (e.g., epoxy bond), as shown in FIG. 9.

In the above-described manufacturing process shown in FIG. 11, each protrusion 121*a* formed on the outside surface 111*a* of the substrate 111 is eliminated, by machining the outside surface 111*a* after the formation of the insulating layer 115 on the inside surface 111*b* and the inner surface of each recess 121*b*, so that each recess 121*b* converts into the corresponding nozzle hole 113. Owing to this arrangement, an end face of the insulating layer 115 formed on the inner surface of each nozzle hole 113 is precisely made flush with the outside surface 111*a* of the substrate 111, so that the insulating layer 115 serving as a masking member in the non-wetting-layer forming step can be accurately formed on the inner surface of each nozzle hole 113.

Therefore, in the manufacturing process of FIG. 11, it is possible to prevent the eutectoid plating layer as the water-repellent layer 117 from being formed on unnecessary portions of the substrate 111 in the non-wetting-layer forming step, so that the formed water-repellent layer 117 is appropriate for each of the nozzle holes 113.

Each nozzle hole 113 is provided with a desired characteristic of ink ejection. Since it is possible to stably establish a desired boundary between the wetting area and the non-wetting area in each nozzle hole, the nozzle holes 113 are provided with the respective ink ejection characteristics which are identical to one another. Consequently, the ink-jet print head 101, having the nozzle plate 110 manufactured according to the present process, exhibits an excellent ink ejection performance.

Further, according to the manufacturing process of FIG. 11, the water-repellent layer 117 can be formed easily and accurately without necessity of charging each nozzle hole with a resist, prior to the implementation of the non-wetting-layer forming step. The nozzle plate 110 is accurately formed in a reduced number of steps, whereby the ink-jet print head 101 can be produced in a reduced cost of manufacturing.

Further, according to the manufacturing process of FIG. 11, the thickness of the insulating layer 115 formed in the insulating-layer forming step is adapted to be equal to that of the water-repellent layer 117 formed in the non-wetting-layer forming step. This arrangement is effective to prevent the water-repellent layer 117 from being projecting from the inner surface of each nozzle hole 113 toward the axis of the nozzle hole 113, thereby minimizing risk of breakage of the water-repellent layer 117 and accordingly avoiding deterioration in accuracy of ejection of the ink, which could be caused in the event of undesirable change of configuration of the opening 114 of each nozzle hole 113. If the water-repellent layer 117 were formed to overhang each nozzle hole 113, an overhanging portion of the water-repellent layer 117 would be easily broken upon application of impact to the layer 117, whereby the accuracy of the ink ejection would be deteriorated.

Further, according to the manufacturing process of the FIG. 11, the insulating layer 115 is provided by the layer made of silicon dioxide containing carbon, and is accordingly provided with a lower degree of membrane stress than where the insulating layer is provided by a layer made of high-purity silicon dioxide. Owing to the lower degree of membrane stress of the insulting layer 115, the insulating layer 115 is not undesirably removed from the substrate 111 in the surface smoothing step in which the outside surface 111*a* of the substrate 111 is smoothed to eliminate each protrusion 121*a* formed on the outside surface 111*a*.

Since it is common that the head body 103 including the passage-defining unit is made of a stainless material which is not easily corroded, the nozzle plate 110 also made of a stainless material cannot be bonded to the head body 103 with a sufficiently high degree of bonding strength. However, in the present embodiment in which the nozzle plate 110 is covered at its inside surface with the insulating layer 115 made of silicon dioxide, the nozzle plate 110 can be bonded at its inside surface to the head body 103 with a sufficiently high degree of bonding strength, thereby improving durability of the ink-jet print head 101.

While the thickness of the insulating layer 115 is adapted to be equal to that of the water-repellent layer 117 in the manufacturing process of the FIG. 11, the thickness of the insulating layer 115 may be larger than that of the water-repellent layer 117. In this modified arrangement, too, overhanging of the water-repellent layer 117 from the edge of each nozzle hole 113 toward the axis of the nozzle hole 113 can be prevented. Further, the insulating layer 115 does not have to be necessarily have to be provided by the layer of silicon dioxide, but may be provided by an oxidized metallic layer, for instance.

Figure 12:
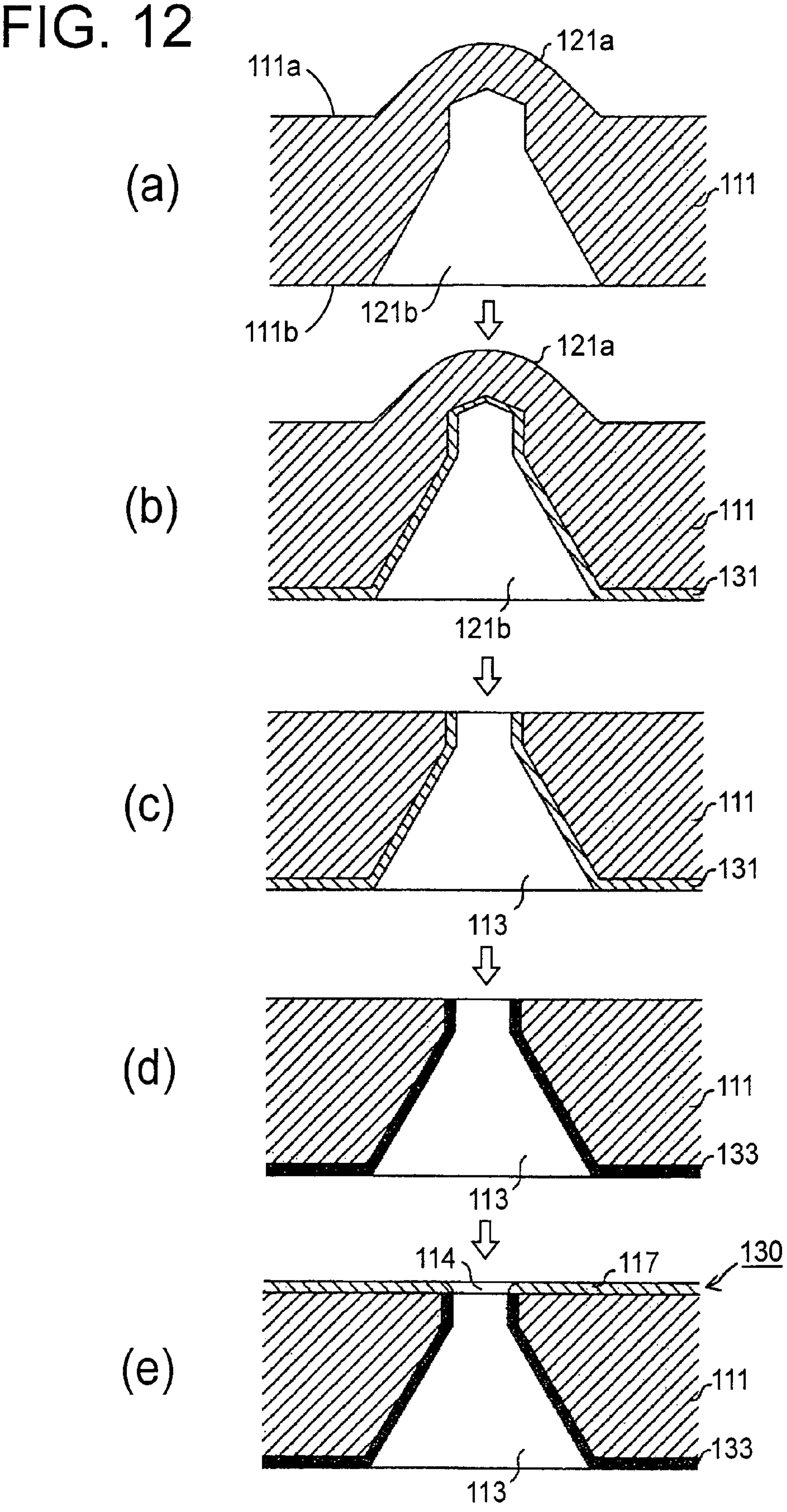
FIGS. 12(*a*)–12(*e*) are views showing a process of manufacturing a nozzle plate according to a third embodiment of the invention.

FIG. 12 shows a process of manufacturing a nozzle plate 130 which is substantially identical with the above-described nozzle plate 110 except that an insulating layer 133 is provided by a metallic layer 131 that is oxidized.

This process includes a deforming step, a covering-layer forming step, a surface smoothing step, a layer oxidizing step and a non-wetting-layer forming step, which are illustrated at (a), (b), (c), (d) and (e) of FIG. 12, respectively. Like the manufacturing of the above-described nozzle plate 110, the substrate 111 may be provided by a flat plate made of a stainless steel.

The process is initiated with the deforming step of plastically deforming portions of the substrate 111 in which the nozzle holes 113 are to be formed, in a direction away from the inside surface 111*b* toward the outside surface 111*a*. In this instance, a suitable punch is used to plastically deform each of the above-described portions of the substrate 111 such that the recess 121*b* and the protrusion 121*a* are concurrently formed in the inside and outside surfaces 111*b*, 111*a* of each of the portions of the substrate 111, respectively, and such that the recess 121*b* has a depth not smaller than the thickness of the substrate 111, as illustrated at (a) of FIG. 12. The deforming step is followed by a cleaning step of cleaning the entirety of the substrate 111 by, for example, an ultrasonic cleaning.

The covering-layer forming step is implemented to form the metallic layer 131 on the inside surface 111*b* and the inner surface of each of the recesses 121*b* in a dry forming or a wet forming such as an electrolytic plating. In this instance, the metallic layer 131 is formed of a metallic material that can be oxidized easier than the substrate 111.

It is noted that the metallic layer 131 is formed to have a thickness equal to that of the water-repellent layer 117 formed in the non-wetting-layer forming step. The material for providing the metallic layer 131 may be tantalum (Ta) or copper (Cu), for example.

The covering-layer forming step is followed by the surface smoothing step in which the protrusions 121*a* protruding from the outside surface 111*a* are eliminated by polishing, lapping, grinding or otherwise machining the outside surface 111*a* in a known manner. With the elimination of the protrusions 121*a*, the recesses 121*b* convert into the respective nozzle holes 113, as illustrated at (c) of FIG. 12.

The layer oxidizing step is then implemented to oxidize the metallic layer 131 (which has been formed to cover the inside surface 111*b* and the inner surface of each recess 121*b* in the covering-layer forming step), by heating the substrate 111 at a temperature of 400–500° C. in the ambient air, such that the metallic layer 131 converts into the insulating layer 133 in the form of an oxidized tantalum layer or an oxidized copper layer, as illustrated at (d) of FIG. 12.

The layer oxidizing step is followed by the non-wetting-layer forming step for forming the water-repellent layer 117 in the form of an eutectoid plating layer containing a fluorine. The non-wetting-layer forming step is implemented in an electrolytic plating operation in which the substrate 111 to be plated is made an electrode and suspended in a solution containing fluororesin particles.

In the electrolytic plating operation of the non-wetting-layer forming step, the substrate 111 is immersed in a nickel solution in which molecules of PTFE (poly tetra fluoro ethylene) are dispersed. The water-repellent layer 117 can be deposited on a selected surface of the substrate 111, i.e., on the outside surface 111*a* which is not masked by the insulating layer 133 in the form of the oxidized tantalum layer or the oxidized copper layer.

Since the water-repellent layer 117 consisting of the eutectoid plating layer grows in an isotropic manner, the water-repellent layer 117 is formed to have the same thickness as the metallic layer 131 which has been formed on the inside surface 111*b* and the inner surface of the recess 121*b* in the metallic-layer forming step. That is, in the non-wetting-layer forming step, the thickness of the formed water-repellent layer 117 is adjusted such that the water-repellent layer 117 does not overhang each of the nozzle holes 113, namely, such that the water-repellent layer 117 does not project from the inner surface of each nozzle hole 113 toward the axis of the nozzle hole 113.

The preparation of the nozzle plate 130 is completed with the completion of the non-wetting-layer forming step. The completed nozzle plate 130 is bonded at its inside surface to the head body 103 by the adhesive 105 (e.g., epoxy bond).

In the above-described manufacturing process shown in FIG. 12, each protrusion 121*a* formed on the outside surface 111*a* of the substrate 111 is eliminated, by machining the outside surface 111*a* after the formation of the metallic layer 131 on the inside surface 111*b* and the inner surface of each recess 121*b*, so that each recess 121*b* converts into the corresponding nozzle hole 113. Owing to this arrangement, an end face of the metallic layer 131, which converts into the insulating layer 133 in the layer oxidizing step, is precisely made flush with the outside surface 111*a* of the substrate 111, so that the insulating layer 133 serving as a masking member in the non-wetting-layer forming step can be accurately formed on the inner surface of each nozzle hole 113.

Therefore, in the manufacturing process of FIG. 12, it is possible to prevent the water-repellent layer 117 from being formed on unnecessary portions of the substrate 111 in the non-wetting-layer forming step, so that the formed water-repellent layer 117 is appropriate for each of the nozzle holes 113.

Each nozzle hole 113 is provided with a desired characteristic of ink ejection. Since it is possible to stably establish a desired boundary between the wetting area and the non-wetting area in each nozzle hole, the nozzle holes 113 are provided with the respective ink ejection characteristics which are identical to one another. Consequently, the ink-jet print head 101, having the nozzle plate 130 manufactured according to the present process, exhibits an excellent ink ejection performance.

Further, according to the manufacturing process of FIG. 12, the thickness of the metallic layer 131 formed in the covering-layer forming step is adapted to be equal to that of the water-repellent layer 117 formed in the non-wetting-layer forming step. This arrangement is effective to prevent the water-repellent layer 117 from projecting from the inner surface of each nozzle hole 113 toward the axis of the nozzle hole 113, thereby minimizing risk of breakage of the water-repellent layer 117 and accordingly avoiding deterioration in accuracy of ejection of the ink, which could be caused in the event of undesirable change of configuration of the opening 114 of each nozzle hole 113.

While the presently preferred embodiments of the present invention have been described above in detail, it is to be understood that the invention is not limited to the details of the illustrated embodiments, but may be otherwise embodied.

In the above-described embodiments, the non-wetting layer is provided by the water-repellent plating layer 52 or 117 which is formed of Ni-PTFE. However, the non-wetting layer may be provided by any other kind of layer as long as the layer has a non-wetting characteristic and is formable on the substrate 60 or 111.

In the manufacturing processes of FIGS. 6–8, each nozzle hole 13 is formed by effecting a press operation in which the substrate 60 is punched, like in the process of FIG. 5. However, in the processes of FIGS. 6–8, each nozzle hole 13 may be otherwise formed.

In the above-described manufacturing process of FIG. 11, the insulating layer 115 is formed of silicon dioxide ($SiO_2$) in accordance with CVD method. However, the insulating layer may be formed of a nitride such as silicon nitride ($Si_3N_4$) or an oxide such as aluminum oxide ($Al_2O_3$). Further, the formation of the insulating layer may be effected in accordance with PVD method such as a sputtering method.

While the thickness of the metallic layer 131 is adapted to be equal to that of the water-repellent layer 117 in the manufacturing process of FIG. 12, the thickness of the metallic layer 131 may be larger than that of the water-repellent layer 117. In this modified arrangement, too, overhanging of the water-repellent layer 117 from the edge of each nozzle hole 113 toward the axis of the nozzle hole 113 can be prevented.

Further, in the manufacturing process of FIG. 12, the material for providing the metallic layer 131 does not have to be necessarily tantalum (Ta) or copper (Cu), but may be other kind of material that is oxidizable easier than the substrate 111.

While the presently preferred embodiments of this invention have been described above in detail by reference to the accompanying drawings, for illustrative purpose only, it is to be further understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A process of manufacturing a nozzle plate for an ink-jet print head, said nozzle plate including (a) a substrate having an outside surface which is to be opposed to a print media, an inside surface which is opposite to said outside surface and nozzle holes which are formed through said substrate so as to be open in said outside and inside surfaces, and (b) a non-wetting layer which has a non-wetting characteristic and which covers said outside surface of said substrate, said process comprising:

a masking step of applying a resist on said inside surface of said substrate, and charging said nozzle holes with said resist such that portions of said resist protrude outwardly from openings of said nozzle holes on said outside surface;

a non-wetting-layer forming step of forming said non-wetting layer on said outside surface in a plating operation; and an unmasking step of removing said resist from said nozzle holes after forming said non-wetting layer.

2. A process according to claim 1, further comprising a surface smoothing step of smoothing said outside surface and eliminating the outwardly protruding portions of said resist such that flat end surfaces of said resist which are flush with said outside surface are formed.

3. A process according to claim 1, wherein said non-wetting-layer forming step is implemented after implementation of said masking step, such that said non-wetting layer is formed on said outside surface that is not masked with said resist.

4. A process according to claim 1, wherein said unmasking step is implemented such that said resist is removed from said inside surface as well as from said nozzle holes.

5. A process of manufacturing a nozzle plate for an ink-jet print head, said nozzle plate including (a) a substrate having an outside surface which is to be opposed to a print media, an inside surface which is opposite to said outside surface and nozzle holes which are formed through said substrate so as to be open in said outside and inside surfaces, and (b) a non-wetting layer which has a non-wetting characteristic and which covers said outside surface of said substrate, said process comprising:

a substrate setting step of setting said substrate on a support, such that said outside surface is positioned downwardly of said inside surface, without openings of said nozzle holes on said outside surface being in contact with said support;

a masking step of applying an insulating material on said inside surface and charging said nozzle holes with said insulating material;

a non-wetting-layer forming step of forming said non-wetting layer on said outside surface; and an unmasking step of removing said insulating material from said substrate, wherein said masking step includes:

an insulating-material disposing step of disposing a resist as said insulating material on said inside surface of said substrate; and a bar coating step of disposing a bar on said resist disposed on said inside surface, and moving at least one of said bar and said substrate relative to the other in a direction parallel to said inside surface such that portions of said resist protrude outwardly from openings of said nozzle holes on said outside surface of said substrate.

6. A process according to claim 5, wherein said support has a large height portion and a small height portion, and wherein said substrate is set on said support in said substrate setting step, such that said substrate is supported by said large height portion while each of said openings of said nozzle holes is positioned above said small height portion.

7. A process according to claim 5, wherein said bar coating step is implemented such that each of said portions of said resist protrudes outwardly from a corresponding one of said openings of said nozzle holes by at least 1 μm.

8. A process of manufacturing a nozzle plate for an ink-jet print head, said nozzle plate including (a) a substrate having an outside surface which is to be opposed to a print media, an inside surface which is opposite to said outside surface and nozzle holes which are formed through said substrate so as to be open in said outside and inside surfaces, and (b) a non-wetting layer which has a non-wetting characteristic and which covers said outside surface of said substrate, said process comprising:

a through-holes forming step of forming through-holes as said nozzle holes in said substrate, by punching said substrate from said inside surface toward said outside surface;

a masking step of applying an insulating material on said inside surface and charging said nozzle holes with said insulating material;

a surface smoothing step of smoothing said outside surface;

a non-wetting-layer forming step of forming said non-wetting layer on said outside surface in a plating operation; and an unmasking step of removing said insulating material from said substrate.

9. A process according to claim 8, wherein said nozzle holes are charged with a resist as said insulating material in said masking step such that portions of said resist protrude outwardly from openings of said nozzle holes on said outside surface of said substrate.

10. A process according to claim 9, wherein each of said portions of said resist protrudes outwardly from a corresponding one of said openings of said nozzle holes by at least 1 μm.

11. A process according to claim 8, wherein said masking step includes:

an insulating-material disposing step of disposing a resist as said insulating material on said inside surface of said substrate; and a bar coating step of disposing a bar on said resist disposed on said inside surface, and moving at least one of said bar and said substrate relative to the other in a direction parallel to said inside surface such that portions of said resist protrude outwardly from openings of said nozzle holes on said outside surface of said substrate.

12. A process according to claim 8, wherein said surface smoothing step is implemented by a lapping operation in which the outwardly protruding portions of said resist, together with burrs formed at edges of said openings of said nozzle holes on said outside surface in said through-holes forming step, are eliminated.

13. A process of manufacturing a nozzle plate for an ink-jet print head, said nozzle plate including (a) a substrate having an outside surface which is to be opposed to a print media, an inside surface which is opposite to said outside surface and nozzle holes which are formed through said substrate so as to be open in said outside and inside surfaces, and (b) a non-wetting layer which has a non-wetting characteristic and which covers said outside surface of said substrate, said process comprising:

a masking step of applying an insulating material on said inside surface and charging said nozzle holes with said insulating material, by superposing said substrate on a resist layer formed of a resist as said insulating material, such that said inside surface is brought into contact with said resist layer, so that said nozzle holes are charged with said resist owing to a capillary action of said resist;

a non-wetting-layer forming step of forming said non-wetting layer on said outside surface in a plating operation; and an unmasking step of removing said resist from said substrate.

* * * * *